(12) United States Patent
Egi et al.

(10) Patent No.: US 11,902,043 B2
(45) Date of Patent: Feb. 13, 2024

(54) SELF-LEARNING HOME SYSTEM AND FRAMEWORK FOR AUTONOMOUS HOME OPERATION

(71) Applicant: Huawei Technologies Co., Ltd., Shenzhen (CN)

(72) Inventors: Norbert Egi, Santa Clara, CA (US); Wei Ling, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 17/221,354

(22) Filed: Apr. 2, 2021

(65) Prior Publication Data
US 2021/0225530 A1 Jul. 22, 2021

Related U.S. Application Data

(63) Continuation of application No. PCT/CN2019/091375, filed on Jun. 14, 2019.
(Continued)

(51) Int. Cl.
*H04L 12/28* (2006.01)
*G06N 20/00* (2019.01)
(Continued)

(52) U.S. Cl.
CPC ......... *H04L 12/2803* (2013.01); *G06N 20/00* (2019.01); *G16Y 10/80* (2020.01);
(Continued)

(58) Field of Classification Search
None
See application file for complete search history.

(56) References Cited

U.S. PATENT DOCUMENTS

| 2016/0116343 A1* | 4/2016 | Dixon ................... G05B 15/02 |
| | | 250/342 |
| 2016/0205697 A1 | 7/2016 | Tan et al. |
| 2019/0187633 A1* | 6/2019 | Naito .................. G05B 13/024 |

FOREIGN PATENT DOCUMENTS

| CN | 101281740 A | 10/2008 |
| CN | 105137781 A | 12/2015 |

(Continued)

OTHER PUBLICATIONS

"International Application No. PCT/CN2019/091375, International Search Report dated Sep. 16, 2019", (Sep. 16, 2019), 3 pgs.

(Continued)

*Primary Examiner* — William G Trost, IV
*Assistant Examiner* — Christopher P Cadorna
(74) *Attorney, Agent, or Firm* — Schwegman Lundberg & Woessner, P.A.

(57) ABSTRACT

A computer-implemented method for automated operation of network devices within a home communication network includes detecting actuator actions for a plurality of actuators within the home communication network, each actuator of the plurality of actuators configured to change a state of at least one network device. The detected actuator actions are correlated with one or more sensor values from a plurality of sensors within the home communication network to generate configuration data. The configuration data includes a trigger graph with one or more trigger conditions and an action graph corresponding to the trigger graph. The action graph indicates one or more actuator actions associated with at least one actuator of the plurality of actuators. Upon detecting a trigger condition of the one or more trigger conditions, the at least one actuator of the plurality of actuators is triggered to perform the one or more actions indicated by the action graph.

20 Claims, 22 Drawing Sheets

Related U.S. Application Data

(60) Provisional application No. 62/770,070, filed on Nov. 20, 2018.

(51) Int. Cl.
    *G16Y 20/10*     (2020.01)
    *G16Y 10/80*     (2020.01)
    *G16Y 20/20*     (2020.01)
    *G16Y 40/35*     (2020.01)

(52) U.S. Cl.
    CPC .............. *G16Y 20/10* (2020.01); *G16Y 20/20* (2020.01); *G16Y 40/35* (2020.01)

(56) References Cited

FOREIGN PATENT DOCUMENTS

| CN | 107728590 A | 2/2018 |
|---|---|---|
| CN | 108549251 A | 9/2018 |
| WO | WO-2020103443 A1 | 5/2020 |

OTHER PUBLICATIONS

"International Application No. PCT/CN2019/091375, Written Opinion of the International Searching Authority dated Sep. 16, 2019", (Sep. 16, 2019), 3 pgs.

\* cited by examiner

SELF-LEARNING HOME SYSTEM AND FRAMEWORK FOR AUTONOMOUS HOME OPERATION

CROSS-REFERENCE TO RELATED APPLICATIONS

This application is a continuation application of International Application No. PCT/CN2019/091375, filed Jun. 14, 2019, which claims the benefit of priority to U.S. Provisional Application No. 62/770,070, filed on Nov. 20, 2018, entitled "Self-Learning Home System and Framework for Autonomous Home Operation," the benefit of priority of each of which is claimed herein, and which applications and publication are hereby incorporated herein by reference in their entirety.

TECHNICAL FIELD

The present disclosure is related to smart home solutions for controlling devices in a home communication network. Some aspects relate to a self-learning home system for controlling devices within the home and providing a framework for autonomous home operation.

BACKGROUND

Internet-of-Things (IoT) devices and solutions are becoming more widely adopted into home and office environments. Such connected devices can be used in multiple ways, from enhancing the comfort level through improving the feature set of homes, to increasing the efficiency and security of other devices.

Existing home automation solutions consolidate the control of home appliances into a mobile device application and can enable simplified rules to be created by the users and to be triggered by user actions. The challenge of the existing home automation solutions, however, is that they require the users to explicitly define the rules of how the appliances/devices should work together, which can become more than challenging even for technically inclined people as the number and complexity of triggerable appliances increases.

SUMMARY

Various examples are now described to introduce a selection of concepts in a simplified form that is further described below in the detailed description. The Summary is not intended to identify key or essential features of the claimed subject matter, nor is it intended to be used to limit the scope of the claimed subject matter.

According to a first aspect of the present disclosure, there is provided a computer-implemented method of automated operation of network devices within a home communication network. The method includes detecting actuator actions for a plurality of actuators within the home communication network, each actuator of the plurality of actuators configured to change a state of at least one network device. The detected actuator actions are correlated with one or more sensor values from a plurality of sensors within the home communication network to generate configuration data. The configuration data can include a trigger graph with one or more trigger conditions. The configuration data also includes an action graph corresponding to the trigger graph. The action graph indicates one or more actuator actions associated with at least one actuator of the plurality of actuators. Upon detecting a trigger condition of the one or more trigger conditions, the at least one actuator of the plurality of actuators can be triggered to perform the one or more actions indicated by the action graph.

In a first implementation form of the method according to the first aspect as such, the one or more trigger conditions include one or more of the following: the one or more sensor values, an actuator action of the detected actuator actions, or external data received from an information source outside of the home communication network.

In a second implementation form of the method according to the first aspect as such or any preceding implementation form of the first aspect, the one or more trigger conditions within the trigger graph are connected via one or more logical connectors.

In a third implementation form of the method according to the first aspect as such or any preceding implementation form of the first aspect, the at least one actuator of the plurality of actuators is triggered to perform the one or more actuator actions indicated by the action graph upon detecting a trigger condition of the one or more trigger conditions and further based on the one or more logical connectors.

In a fourth implementation form of the method according to the first aspect as such or any preceding implementation form of the first aspect, the action graph includes a plurality of nodes coupled via edges. Each node of the plurality of nodes corresponds to an actuator action of the one or more actuator actions associated with the at least one actuator of the plurality of actuators.

In a fifth implementation form of the method according to the first aspect as such or any preceding implementation form of the first aspect, each of the edges coupling at least two nodes of the plurality of nodes, and the each of the edges associated with a time delay between the one or more actuator actions corresponding to the at least two nodes.

In a sixth implementation form of the method according to the first aspect as such or any preceding implementation form of the first aspect, a training data set including a plurality of pre-determined trigger conditions and a plurality of pre-determined actuator actions corresponding to the plurality of pre-determined trigger conditions is acquired. A machine learning (ML) program is trained using at least the training data set to generate a trained ML program. The trained ML program is applied to the detected actuator actions and the one or more sensor values from the plurality of sensors to generate the configuration data.

In a seventh implementation form of the method according to the first aspect as such or any preceding implementation form of the first aspect, user-defined objectives for the automated operation of the network devices within the home communication network are retrieved. Pre-defined sensor-actuator relationships grouping a subset of the plurality of actuators with a subset of the plurality of sensors based on common sensor and actuator locations are retrieved. The configuration data is generated further based on the user-defined objectives and the pre-defined sensor-actuator relationships.

In an eighth implementation form of the method according to the first aspect as such or any preceding implementation form of the first aspect, the configuration data includes a table with automated rules, the table including a plurality of trigger graphs and a corresponding plurality of action graphs.

In a ninth implementation form of the method according to the first aspect as such or any preceding implementation form of the first aspect, a second table of automated rules for a second home communication network is retrieved. One or both of the trigger graph or the action graph in the configuration data is modified based on the second table of automated rules.

According to a second aspect of the present disclosure, there is provided a system including a plurality of actuators within a home communication network. Each actuator of the plurality of actuators is configured to change a state of at least one network device within the home communication network. The system further includes a plurality of sensors within the home communication network, the plurality of sensors configured to generate sensor data. The system further includes a memory that stores instructions. The system further includes one or more processors in communication with the memory, the plurality of actuators, and the plurality of sensors. The one or more processors execute the instructions to detect actuator actions for the plurality of actuators and correlate the detected actuator actions with one or more sensor values from the sensor data to generate configuration data. The configuration data includes a trigger graph with one or more trigger conditions and an action graph corresponding to the trigger graph. The action graph indicates one or more actuator actions associated with at least one actuator of the plurality of actuators. Upon detecting a trigger condition of the one or more trigger conditions, the at least one actuator of the plurality of actuators can be triggered to perform the one or more actions indicated by the action graph.

In a first implementation form of the device according to the second aspect as such, the trigger graph includes the one or more trigger conditions connected via one or more logical connectors. The one or more trigger conditions include one or more of the following: the one or more sensor values, an actuator action of the detected actuator actions, or external data received from an information source outside of the home communication network.

In a second implementation form of the device according to the second aspect as such or any preceding implementation form of the second aspect, where the one or more processors execute the instructions to trigger the at least one actuator of the plurality of actuators to perform the one or more actions indicated by the action graph upon detecting a trigger condition of the one or more trigger conditions and further based on the one or more logical connectors.

In a third implementation form of the device according to the second aspect as such or any preceding implementation form of the second aspect, the action graph includes a plurality of nodes coupled via edges. Each node of the plurality of nodes corresponds to an actuator action of the one or more actuator actions associated with the at least one actuator of the plurality of actuators. Each of the edges is coupling at least two nodes of the plurality of nodes, and the each of the edges is associated with a time delay between the one or more actuator actions corresponding to the at least two nodes.

In a fourth implementation form of the device according to the second aspect as such or any preceding implementation form of the second aspect, where the one or more processors execute the instructions to acquire a training data set including a plurality of pre-determined trigger conditions and a plurality of pre-determined actuator actions corresponding to the plurality of pre-determined trigger conditions. A machine learning (ML) program is trained using at least the training data set to generate a trained ML program. The trained ML program is applied to the detected actuator actions and the one or more sensor values from the sensor data to generate the configuration data.

In a fifth implementation form of the device according to the second aspect as such or any preceding implementation form of the second aspect, the one or more processors execute the instructions to retrieve user-defined objectives for the automated operation of the network devices within the home communication network. Pre-defined sensor-actuator relationships grouping a subset of the plurality of actuators with a subset of the plurality of sensors based on common sensor and actuator locations are retrieved. The configuration data is generated further based on the user-defined objectives and the pre-defined sensor-actuator relationships.

In a sixth implementation form of the device according to the second aspect as such or any preceding implementation form of the second aspect, where the configuration data includes a table with automated rules, the table including a plurality of trigger graphs and a corresponding plurality of action graphs.

In a seventh implementation form of the device according to the second aspect as such or any preceding implementation form of the second aspect, where the one or more processors execute the instructions to retrieve a second table of automated rules for a second home communication network and modify one or both of the trigger graph or the action graph in the configuration data based on the second table of automated rules.

According to a third aspect of the present disclosure, there is provided a non-transitory computer-readable medium storing instructions for automated operation of network devices within a home communication network, that when executed by one or more processors, cause the one or more processors to perform operations. The operations include detecting actuator actions for a plurality of actuators within the home communication network, each actuator of the plurality of actuators configured to change a state of at least one network device. The operations further include correlating the detected actuator actions with one or more sensor values from a plurality of sensors within the home communication network to generate configuration data. The configuration data includes a trigger graph with one or more trigger conditions, and an action graph corresponding to the trigger graph. The action graph indicates one or more actuator actions associated with at least one actuator of the plurality of actuators. Upon detecting a trigger condition of the one or more trigger conditions, the at least one actuator of the plurality of actuators is triggered to perform the one or more actions indicated by the action graph.

In a first implementation form of the non-transitory computer-readable medium according to the third aspect as such, where upon execution, the instructions further cause the one or more processors to perform operations including acquiring a training data set including a plurality of pre-determined trigger conditions and a plurality of pre-determined actuator actions corresponding to the plurality of pre-determined trigger conditions. The operations further include training a machine learning (ML) program using at least the training data set to generate a trained ML program, and applying the trained ML program to the detected actuator actions and the one or more sensor values from the sensor data to generate the configuration data.

Any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
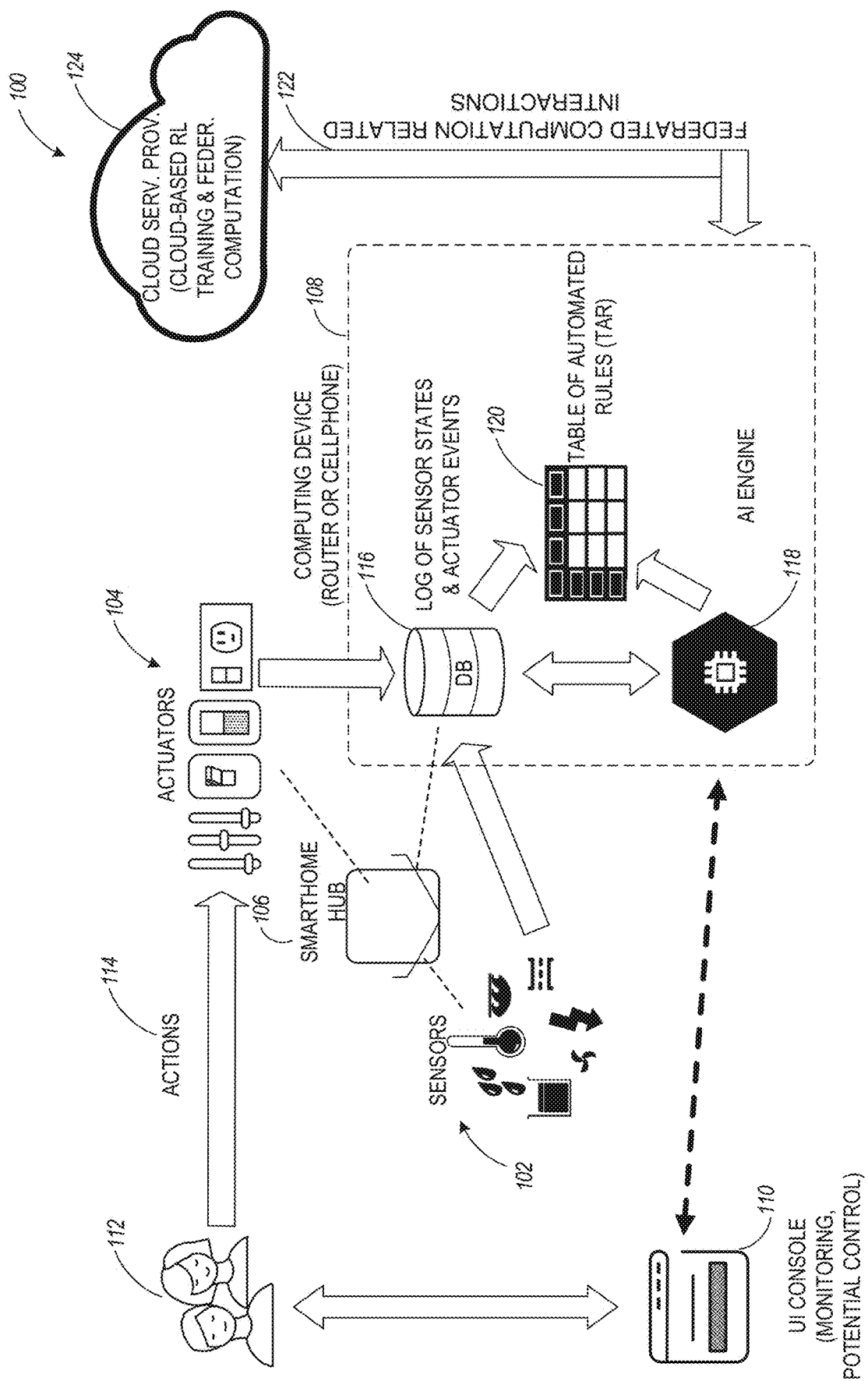
FIG. 1 is a high-level system overview of a home communication network using the automated operation of network devices, according to some example embodiments.

It should be understood at the outset that although an illustrative implementation of one or more embodiments is provided below, the disclosed systems and/or methods described with respect to FIGS. 1-15 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

As used herein, the term "actuator" can refer to a device or a device component (e.g., a light switch, a thermostat, a device knob) that is physically manipulated by a user. In some aspects, an "actuator" can also refer to a device that can be controlled or manipulated with voice, motions, or even through other means, such as brainwaves, emotions, or network signaling. As used herein, the term "sensor" can refer to a device configured to sense environmental conditions (e.g., outside temperature, humidity, wind direction, and so forth) and non-environmental conditions (e.g., motion detection, sound detection, and so forth), provide the sense data to one or more data collection modules or processors.

Techniques disclosed herein for autonomous home operation can include continuously monitoring connected sensors and actuators present within a communication network (e.g., a home communication network at a user's home), periodically collecting the sensor values and the actuator activations, and performing learning computation that identifies correlations among the measured sensor values and actuator activations. The objective of the learning process is to identify the correlations among the measured sensor values and actuator activations and through that identify (1) the activity(ies) performed by users, (2) how the different activities are performed by the user (i.e., the series of actuator activations), (3) user habits, and (4) with that information generate a table of automated rules for performing automated actions using the available actuator devices. In one embodiment these automated actions can mimic the actuator activations normally performed by users during a given activity, but can also perform a different (e.g., a more efficient) execution of activities. The overall objective of the home communication network is to logically combine the different sensors and actuators available and create intelligent sensing and automated device activations, thereby creating an automatically enhanced (in terms of comfort, feature set, security, efficiency, etc.) home environment.

In some aspects, the correlations can be identified using a machine learning (ML) program (also referred to as an artificial intelligence (AI) engine), which can be trained using, e.g., a training data set. The ML program can be configured to generate configuration data (e.g., a table of automated rules) based on the identified correlations. The configuration data can include multiple trigger graphs, each trigger graph having a corresponding action graph. A trigger graph includes one or more trigger conditions, such as a sensor value, an actuator event, and an external information value, which can all be connected via logical operators. Upon detecting that any of the trigger events in a given trigger graph (as modified by the logical operators) are fulfilled, then actions in the corresponding actions graph are performed automatically. The actions can include performing one or more actuator-related events.

In difference to existing home automation solutions where the user has to explicitly provide rules for triggering actions of one or more devices within the system, techniques disclosed herein can be used for automatically generating/updating configuration data for home automation (e.g., a table of automated rules with multiple trigger graphs and corresponding action graphs), and execute actions from the action graph automatically, upon detecting a trigger condition from one or more of the trigger graphs. In addition, machine learning techniques can be used to train the ML program within the home using local sensor and actuator data. In some aspects, learning can be federated so that it can be performed in remote environments (e.g., the ML program can be trained in the cloud), partially relying on data collected in the home combined with other training methods and other training data (e.g., data collected in other locations such as other homes). The home communication network disclosed herein can further provide interfaces for 3rd party devices and application vendors to connect their devices and applications to the network and through that (1) utilize the data, processing capacity, and models/algorithms available within the home network (e.g., a trained ML program) as well as (2) provide additional capabilities to the automated home environment (e.g., additional compute power or sensing capabilities).

FIG. 1 is a high-level system overview of a home communication network 100 using the automated operation of network devices, according to some example embodiments. Referring to FIG. 1, the home communication network 100 can include sensors 102 and actuators 104, which can be communicatively coupled to a computing device 108 such as a router or a mobile phone. In some aspects, sensors 102 can include a temperature sensor, a humidity sensor, a motion sensor, a heat sensor, a smoke sensor, or any other type of sensor. The actuators 104 can include a thermostat, a switch, a device knob, or any other type of device that a user 112 can interact with and change its state via actions 114. As used herein, the term "actuator event" (or "actuator activation") indicates an interaction by the user 112 with one or more of the actuators 104 (e.g., via actions 114) that changes the actuator state (e.g., a switch is turned on or off, a thermostat is adjusted, the window shade is lifted, and so forth).

The computing device 108 can maintain a database 116 of sensor states associated with the sensors 102 as well as actuator events associated with the actuators 104. In some aspects, the sensor states and actuator events can be communicated directly from sensors 102 and the actuators 104 to the computing device 108 for further processing and storage in the database 116. In some aspects, the sensor states and the actuator events can be initially communicated to a hub device 106 (e.g., a smart home hub device), and then communicated to the computing device 108. The computing device 108 can further include an AI engine 118, which can be configured to generate a table of automated rules 120, as further described hereinbelow, based on the sensor data and the actuator events. In some aspects, the AI engine 118 can also use external information, e.g., from a cloud-based provider 124, via interactions 122. The cloud-based provider 124 can be configured to perform, e.g., reinforcement learning training and other federated computations (e.g., assisting multiple users at multiple locations) associated with generating and managing the table of automated rules 120.

The main components of the communication network 100 include the processes of collecting and recording actuator activations, sensor measurement values, executing computation on the sensor and actuator data as well as additional data (e.g., externally available information from the cloud-based provider 124) to create the table of automated rules 120 or trigger actions (e.g., based on table 120) for automated operation of home appliances or other devices connected within the home communication network 100. The creation of the table of automated rules 120 responsible for defining the automated actions can be generated through statistical models, training processes of different machine learning approaches executed either locally (e.g., by device 108) or remotely (e.g., by the cloud-based provider 124), or in a distributed hybrid fashion (e.g., by the cloud-based provider 124 and one or more clients of the cloud-based provider 124).

In some aspects, the home communication network 100 provides additional functionalities, such as personalized computation through the means of federated learning approaches, the ability to share/distribute learned knowledge to the service provider and/or other users at different locations, and the ability to seamlessly extend the system with 3rd party devices and applications providing additional capabilities to the system. While some aspects of the home communication network 100 can operate autonomously and without the requirement of user interaction, home communication network 100 can be configured to provide information about its internals, for example, the functionalities it provides and the automated actions and their triggers that have been learned, to user 112 via the user interface console 110. The user interface console 110 can also be used as an interface for users to influence parts of the operations performed by device 108 by providing feedback, setting objectives for the AI engine 118, sitting sensor-actuator relationships and groupings, and so forth.

Figure 2:
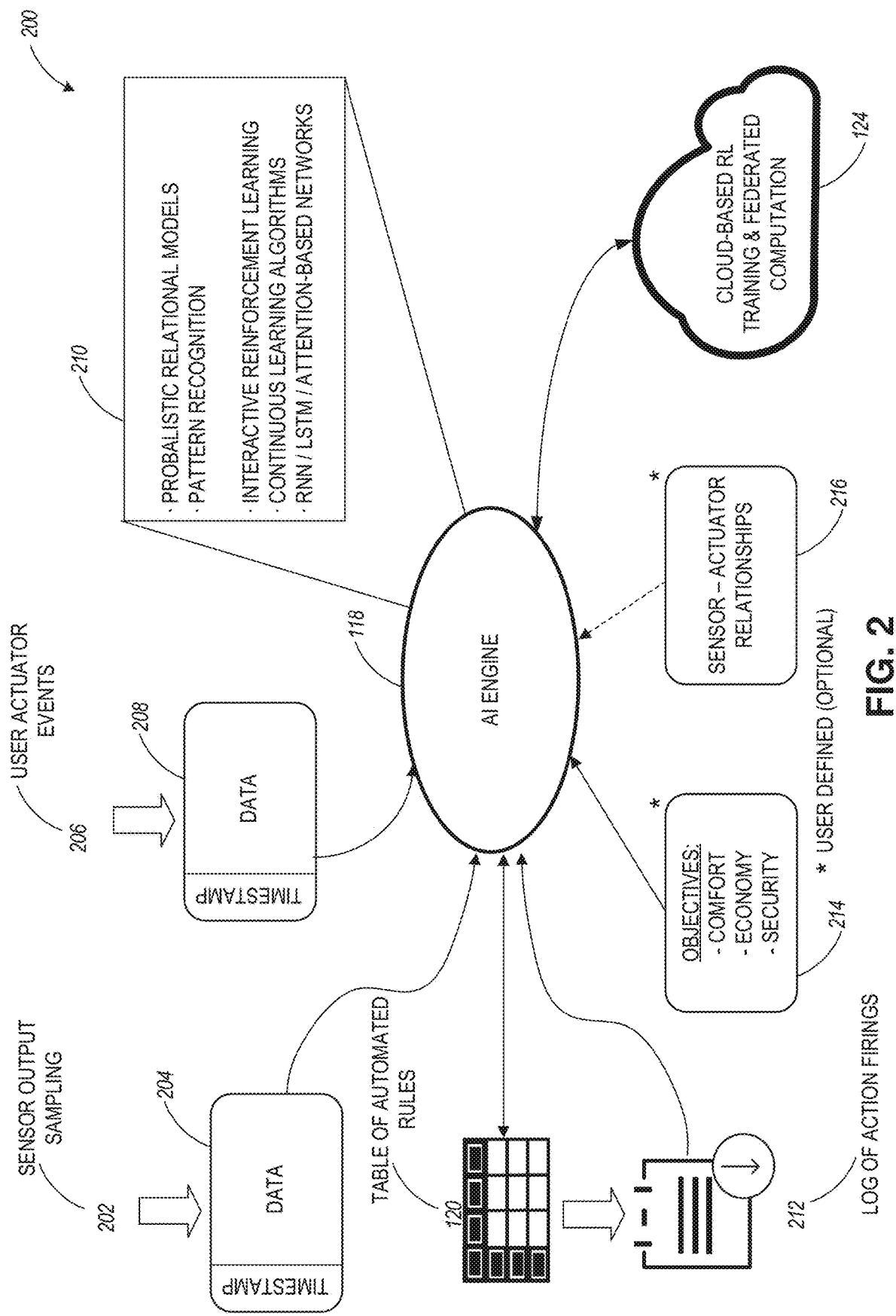
FIG. 2 is a block diagram of a high-level architectural design of the home communication network of FIG. 1, according to some example embodiments.

FIG. 2 is a block diagram of a high-level architectural design 200 of the home communication network of FIG. 1, according to some example embodiments. Referring to FIG. 2, the AI engine 118 can be configured to receive sensor data 204 as a result of sensor output sampling 202 for the sensors 102 and actuator event data 208 as a result of user actuator events 206 for actuators 104. Data 204 and 208 can be time stamped.

In an example embodiment, the AI engine 118 can use one or more of the AI-related computation techniques 210 to generate the table of automated rules 120. For example, techniques 210 can include the use of statistical models, such as probabilistic relational models and pattern recognition techniques. Techniques 210 can also include machine learning (ML) models such as reinforcement learning (RL), interactive reinforcement learning (IRL), continuous learning algorithms, neural networks (NN), recurrent neural networks (RNN), long short-term memory (LSTM), attention-based networks (ABN), and other techniques. The AI engine 118 can also use data from a log of action firings 212 as well as interactions with the cloud-based provider 124. The log of action firings 212 can include a list of actions (e.g., an action performed by an actuator) that have been triggered automatically based on one or more triggers as specified by the table of automated rules 120.

In an example embodiment, the AI engine 118 can further take into account user input (e.g., as received via the UI console 110) such as objectives 214 and pre-defined sensor-actuator relationships 216 when generating or updating the table of automated rules 120. Objectives 214 can include user input specifying the desired level of comfort, energy efficiency or economy, security, or any other user-defined objective. The pre-defined sensor-actuator relationships 216 can include one or more groupings of sensors and actuators, which can be based on common location (e.g., sensors and actuators within a given room or other location within a user's home can be grouped for efficiency).

Figure 3:
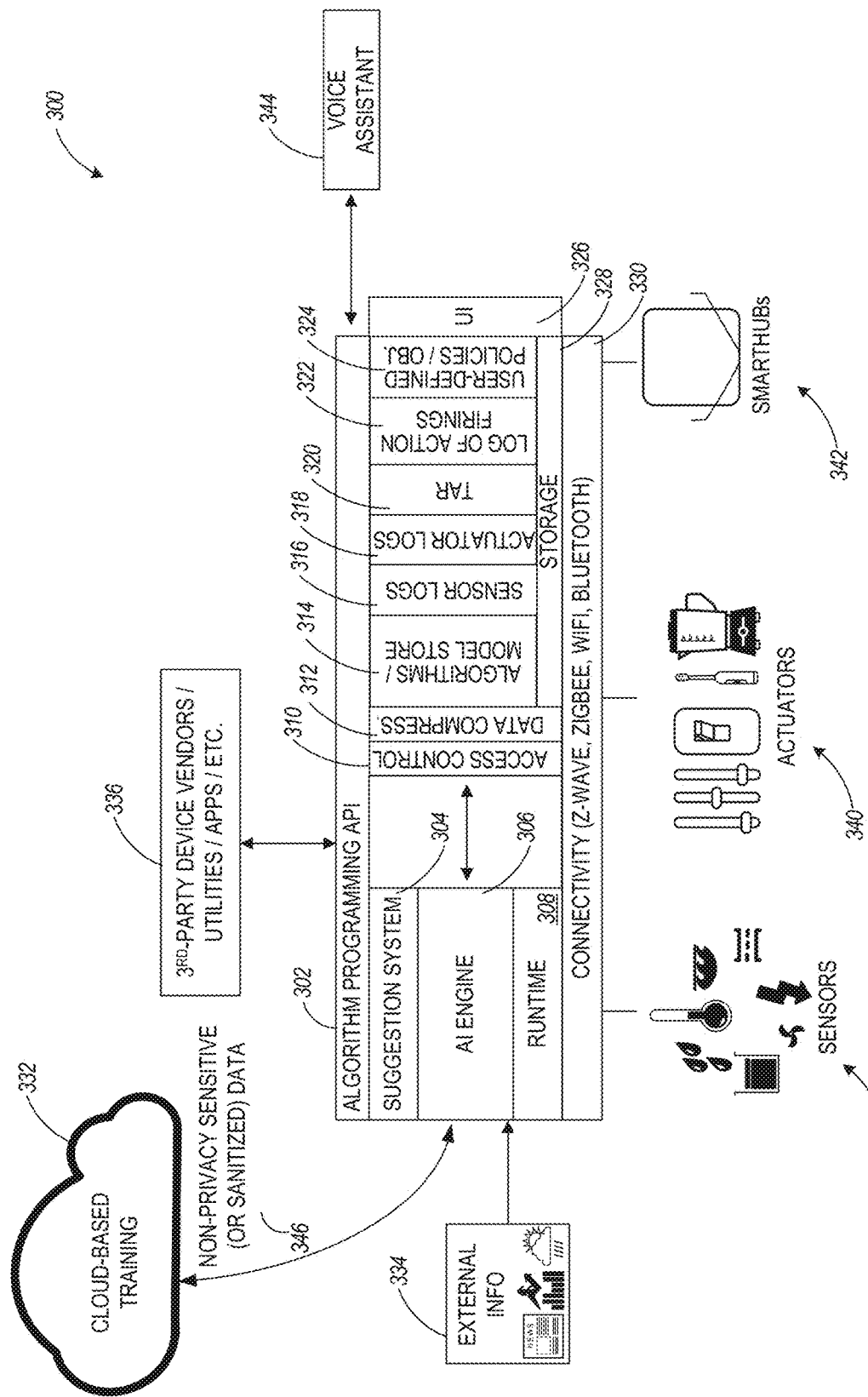
FIG. 3 is a block diagram illustrating implementation details of a computing device that can be used in connection with the home communication network of FIG. 1, according to some example embodiments.

FIG. 3 is a block diagram illustrating implementation details of a computing device 300 that can be used in connection with the home communication network of FIG. 1, according to some example embodiments. Referring to FIG. 3, the computing device 300 can be the same as the device 108 of FIG. 1. The device 300 can implement a connectivity layer 330 which can be used for communication with the sensors 338, the actuators 340, and the data hub 342. The functionalities of sensors 338, the actuators 340, and the data hub 342 can be the same as sensors 102, the actuators 104, and the hub 106, respectively.

The device 300 can be configured to provide a runtime environment 308 and a storage environment 328. The runtime environment 308 can be used to implement the AI engine 306 and a suggestion system 304. The suggestion system 304 can be configured to provide one or more suggestions for installing additional sensors and actuators, or removing existing sensors and actuators, to improve the AI engine performance or based on the user-provided input (e.g., 214 and 216).

Storage environment 328 can be used for configuring an algorithms/model store 314 (for storing models, e.g., 210, used by the AI engine 118), sensor logs 316 (storing sensor data from sensors 338), actuator logs 318 (storing actuator event data associated with actuators 340), table of automated rules 320 is generated by the AI engine 306, a log of action firings 322 (similar to the log 212 listing automated actions performed based on the table of automated rules), and user-defined policies and objectives 324 (e.g., 214 and 216). The device 300 can further perform data compression functionalities 312 in connection with any of the data maintained by the storage environment 328. Additionally, data maintained by the storage environment 328 can be accessed via the access control functionality 310.

In some aspects, the cloud service provider 124 can provide cloud-based training 332 for the AI engine 306. In this regard, raw data (e.g., non-privacy sensitive or sanitized data) associated with a user of device 300 can be exchanged with the cloud-based provider 124. The AI engine 306 can further receive external information 334 which can be used to generate the table of automated rules 320.

The device 300 can further include an application programming interface (API) 302. In this regard, third-party devices or applications 336 can use the API 302 to connect with device 300 (e.g., to assist the AI engine 306 with additional computation capacity, additional sensor and actuator data, and so forth). A voice assistant 344 can also use the API 302 and provide a user interface for voice-based interaction between the device 300 and a user.

Figure 4:
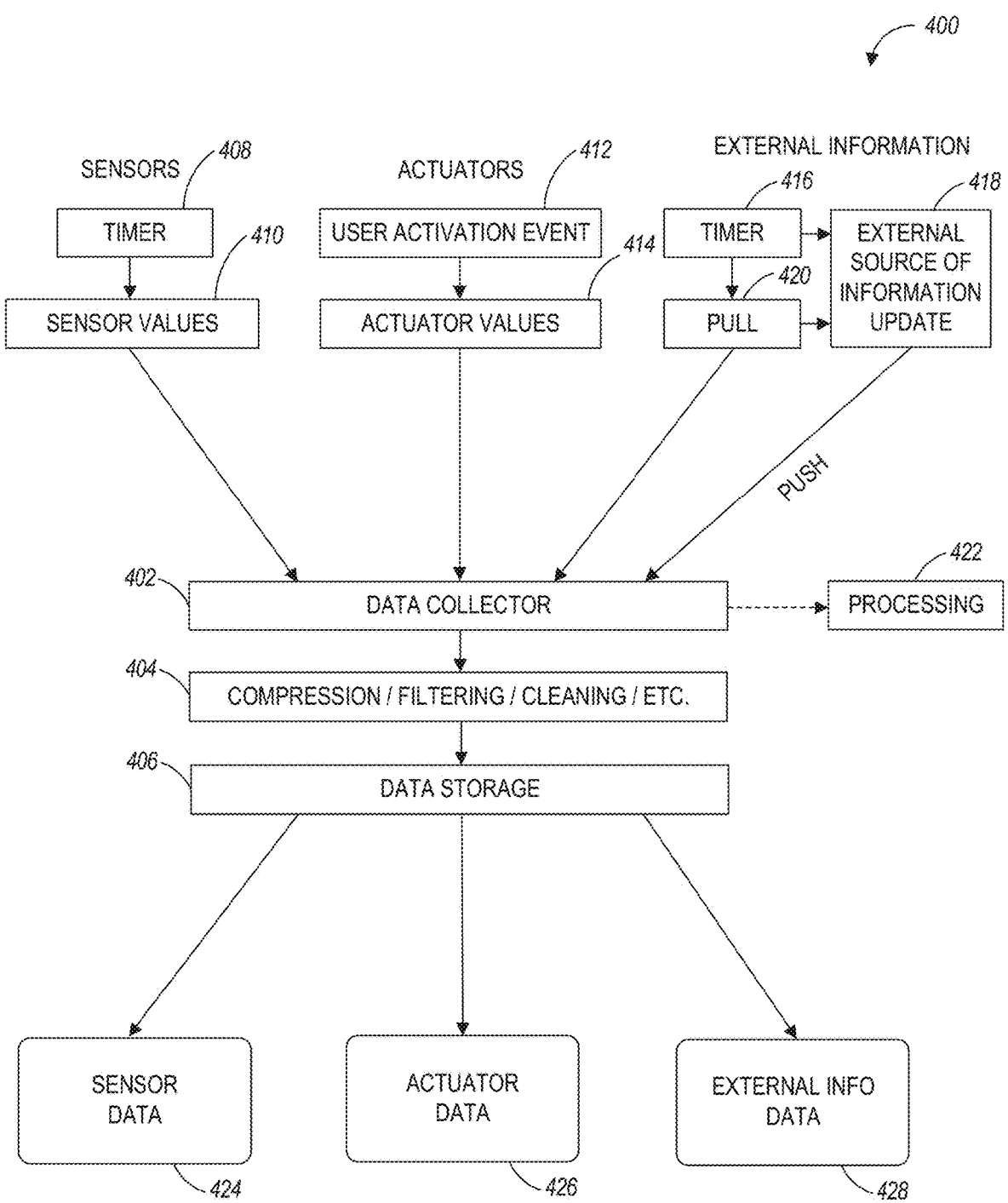
FIG. 4 is a block diagram illustrating a data collection procedure that can be used in connection with the home communication network of FIG. 1, according to some example embodiments.

FIG. 4 is a block diagram illustrating a data collection procedure 400 that can be used in connection with the home communication network of FIG. 1, according to some example embodiments. More specifically, procedure 400 can be used to obtain data for creating the table of automated rules 120 for performing automated actions within the home communication network 100. Sensor values can be constantly monitored and recorded for later processing. In addition, actuator activations triggered by the user or through some other means (i.e., automated operation by a 3rd party device) are closely monitored and recorded as well. For example, a data collector module 402 can obtain sensor values 410 time-stamped by timer 408, and actuator values 414 associated with one or more user activation events 412. The data collector module 402 can also receive external information from an external source 418, with the external information being time-stamped by timer 416. The external information can be pushed by the external source 418 to the data collector 402, or the data collector module 402 can receive the external data via the pull functionality 420.

Actuator activations can take place as a response to changes in the environment and can also have correlations between the different device activations. Correlations between different activations can be related to (i) the same environment change, can be (ii) some form of temporal correlation (i.e., occurring due to time-related reasons), or (iii) can relate to the same activity that is being executed. Changes in the environment can be perceived and recorded through the sensor values which can be analyzed at a later stage and relationships between environment changes and device activations can be identified by the AI engine 118. In addition to data being collected locally from local sensors and actuators the home communication network 100 can rely on (and collect data from) the external source 418 (e.g., the data collector module 402 can collect the external data via the Internet from sources such as weather forecast sources, financial market services, or other types of services including messaging services from local governments, municipalities, schools, services providing location updates of family members, and so forth).

Once data is received by the data collector module 402, it can be forwarded for data processing 422 and storage 406. The storage 406 can be configured to store sensor data 424, actuator data 426, and external data 428. The storage 406 can be both local and remote, with implemented data privacy constraints. Additionally, storage 406 can include a database, a file system, an in-memory storage solution, or some alternative storage solution. Once data is received by the data collector module 402, it can be moved to data storage 406 directly or be pre-processed for more efficient or more secure storage through data compression, filtering, cleaning, encoding, data sanitization 404. At the underlying data storage 406, the sensor data 424, the actuator data 426, and the data from external sources 428 may be stored in separate structures, due to different formatting requirements and uses by the AI engine 118.

Figure 14:
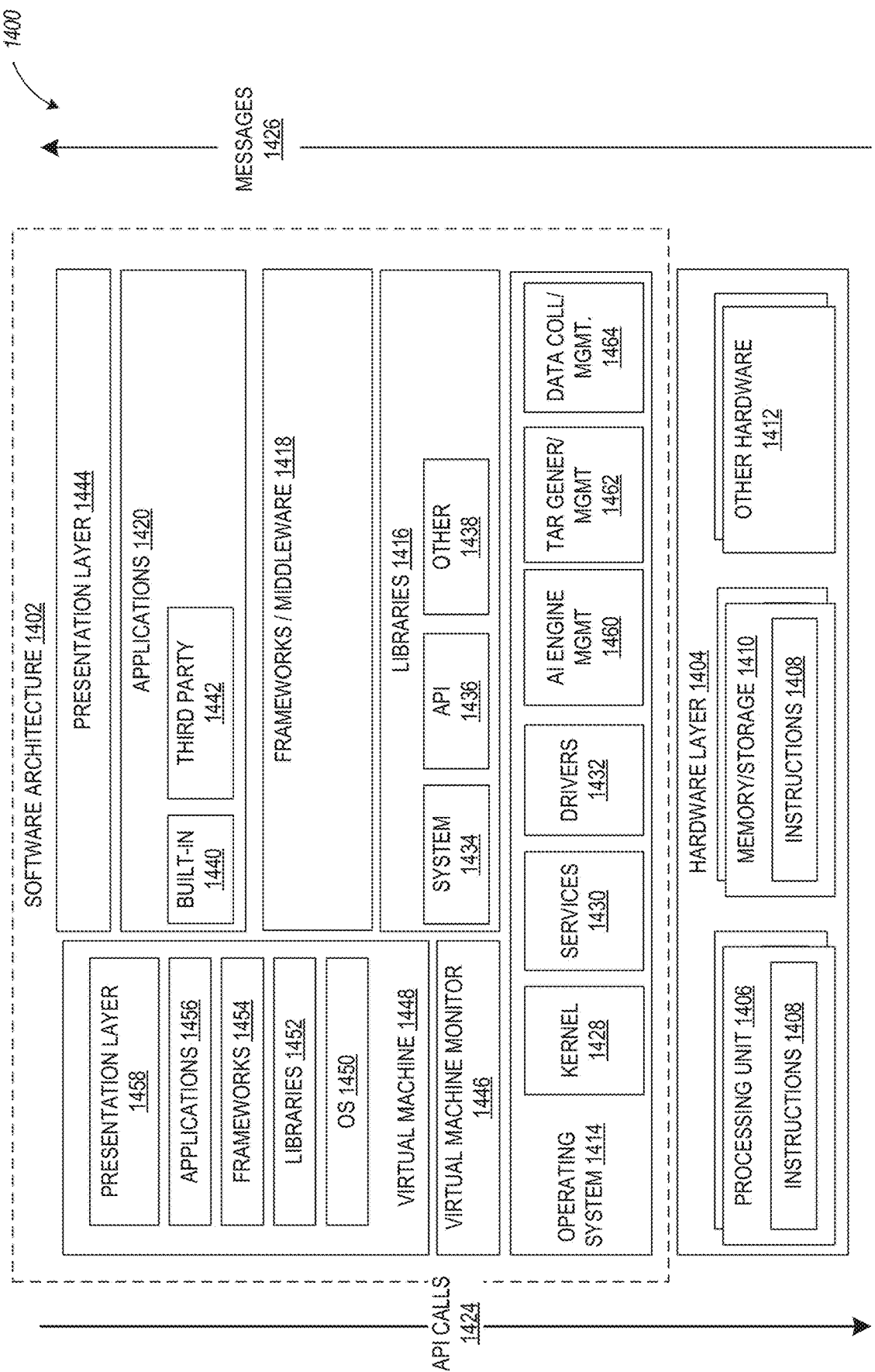
FIG. 14 is a block diagram illustrating a representative software architecture, which may be used in conjunction with various device hardware described herein, according to some example embodiments.
Figure 15:
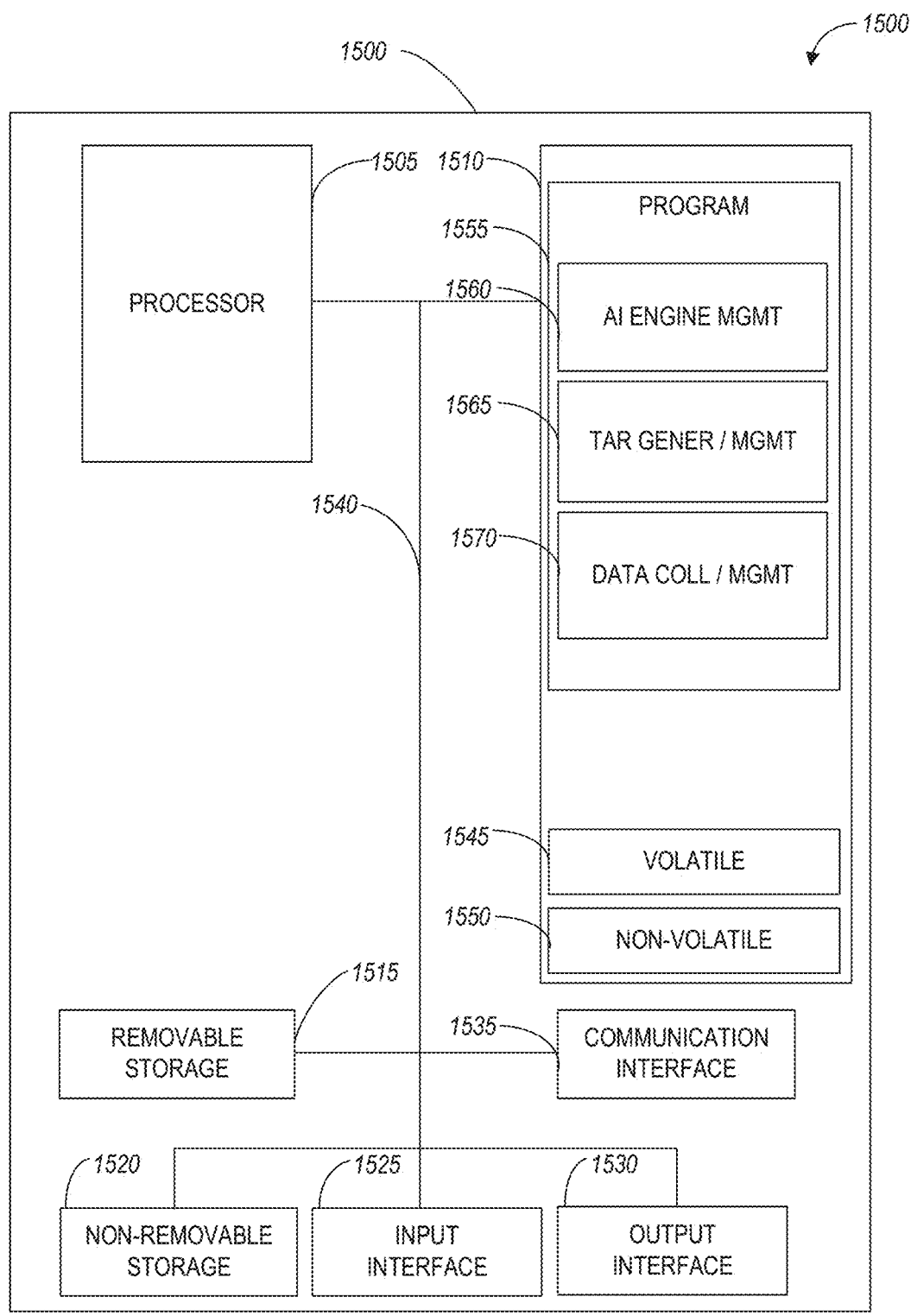
FIG. 15 is a block diagram illustrating circuitry for a device that implements algorithms and performs methods, according to some example embodiments.

Even though FIG. 4 illustrates the data collector module 402 as being separate from the data processing 422 and 404 functionalities, in an example embodiment, data collection and additional processing such as 422 and 404 can be performed by a single module (e.g., data collection and management module 1464 in FIG. 14 or 1570 in FIG. 15).

Figure 5:
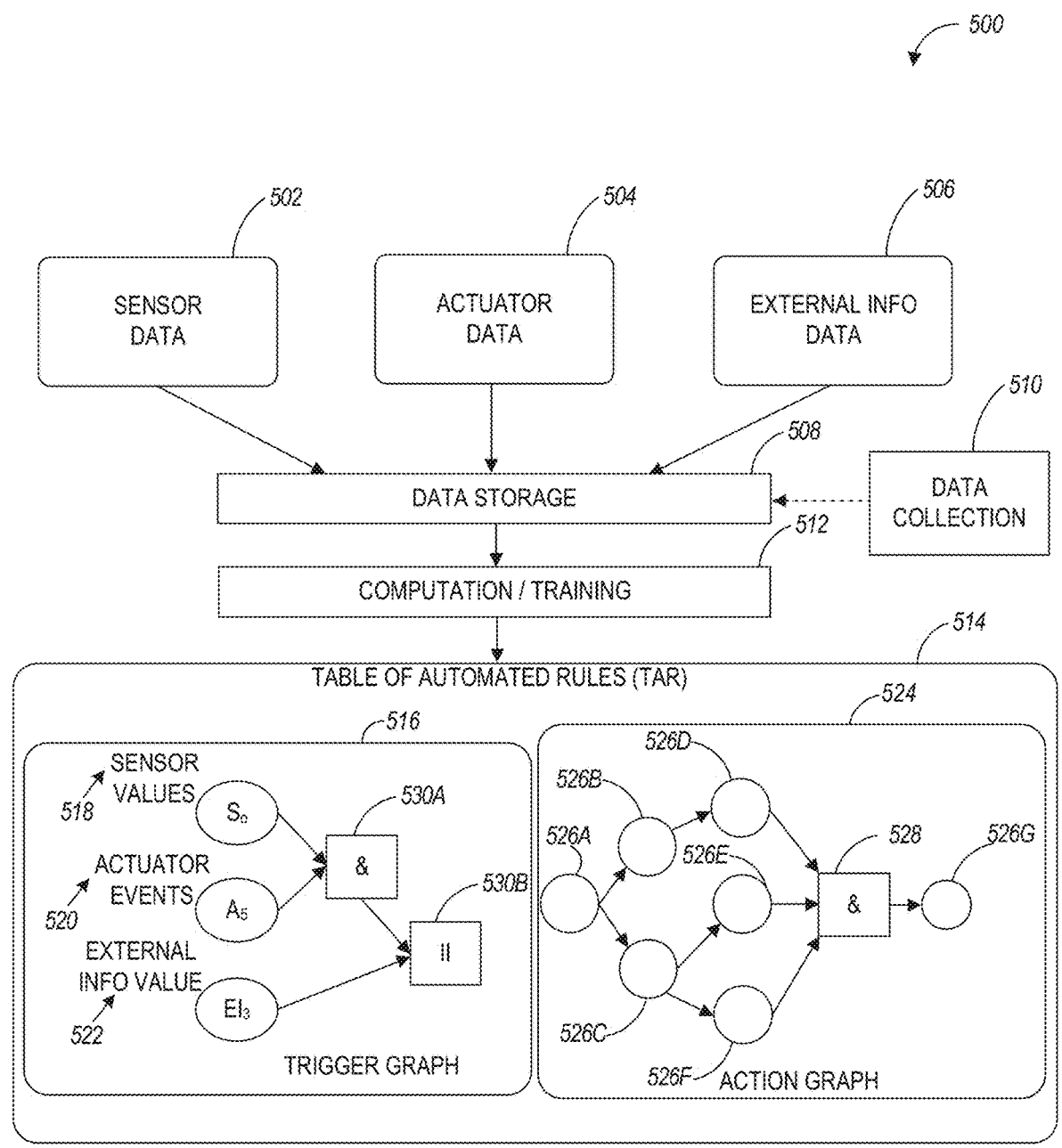
FIG. 5 is a block diagram illustrating a process for creating a table of automated rules that can be used for the automated operation of network devices, according to some example embodiments.

FIG. 5 is a block diagram illustrating a process 500 for creating a table of automated rules that can be used for the automated operation of network devices, according to some example embodiments. Referring to FIG. 5, data storage module 508 is configured to store sensor data 502, actuator data 504, and external data 506 which can be preprocessed (e.g., at 404). In some aspects, the data collection module 510 (which can be the same as the data collector module 402) can directly communicate collected sensor and actuator data to the data storage module 508. During the computation/training process 512, different mathematical, statistical, or machine learning models can be executed or trained by the AI engine 118 to generate the table of automated rules 514.

In an example embodiment, the table of automated rules 514 can include a trigger graph 516 and a corresponding action graph 524. The trigger graph 516 includes nodes describing one or more triggering events, such as certain sensor values 518 (e.g., node $S_0$), actuator events 520 (e.g., node $A_5$), external information values 522 (e.g., node $EI_3$), and any combination thereof. For example, nodes within the trigger graph 516 can be connected by logical operations such as 530A and 530B. In this regard, the trigger graph 516 illustrated in FIG. 5 can trigger performing actions specified by the action graph 524 when sensor value $S_0$ is detected together with actuator event $A_5$, or external information value $EI_3$ is received. The sensor values 518, the actuator events 520, and the external information values 522 can be indexed when stored by the data storage module 508.

In an example embodiment, the action graph 524 can include a plurality of nodes 526A-526G coupled with one or more logical operators such as 528. Once a triggering event specified by the trigger graph 516 is detected (e.g., $S_0$ and $A_5$, or only $EI_3$), then actions specified by the individual nodes within the action graph 524 can be performed automatically. In this regard, action graph 524 can be used to describe the actions to be executed upon detection of a triggering event specified by the trigger graph. Each of the nodes 526A-526G can specify an actuator event that has to be performed. Action graph 524 can further define the order of different actions to be executed and can also specify timing constraints among the actions or other conditional values between the different actions. For example, the link/edge between every two connected nodes can be annotated with a timing delay between performing the actuator events associated with each node. As an alternative, the length of each link/edge between a pair of connected nodes can be proportional to the timing delay. In an example embodiment, the table of automated rules 514 can include a plurality of trigger graphs, with each trigger graph having a corresponding action graph. Additionally, the table of automated rules 514 can be continuously updated based on the sensor data 502, the actuator data 504, the external data 506, user input (e.g., 214 and 216), or other criteria.

Figure 6A:
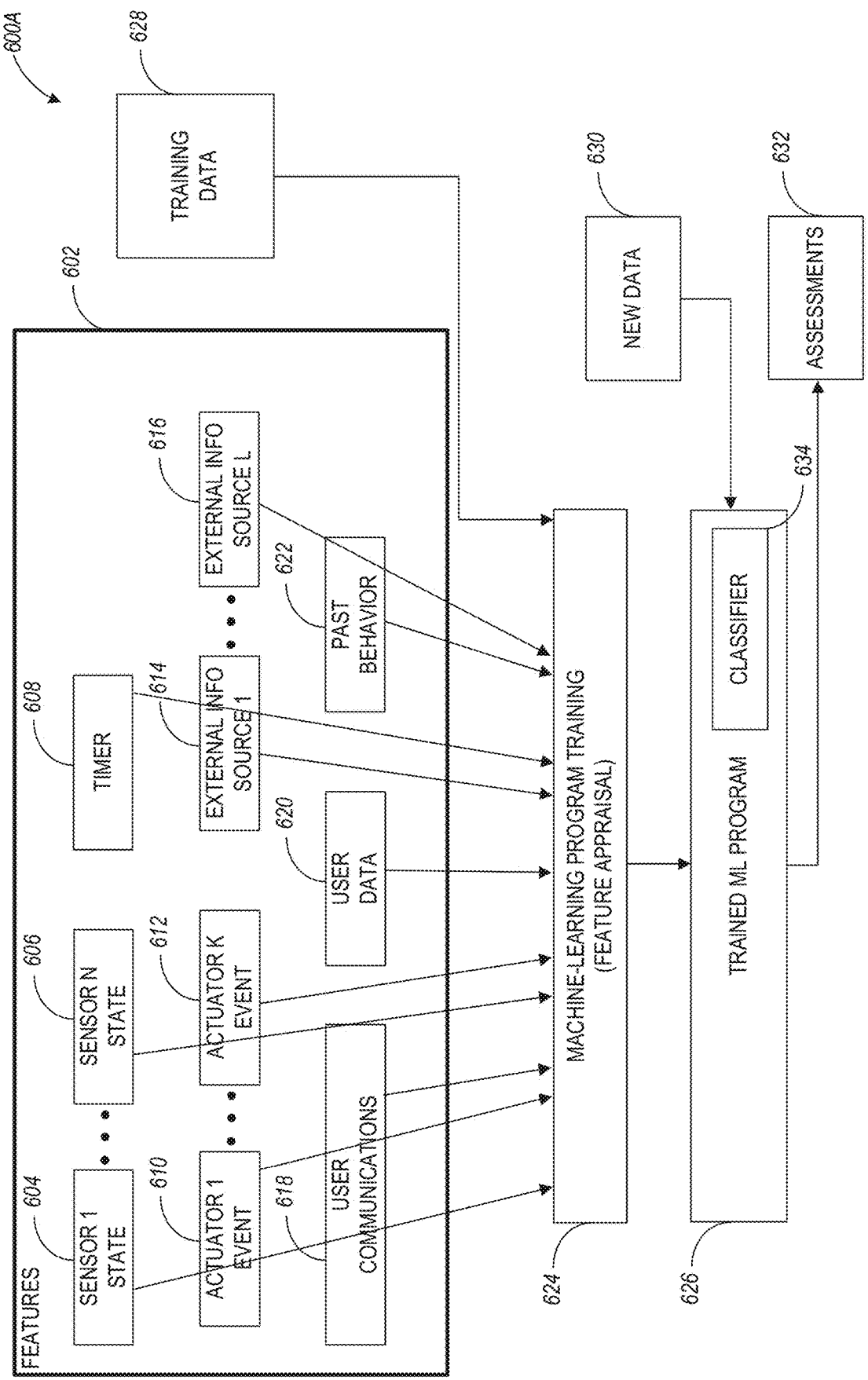
FIG. 6A is a block diagram illustrating the training and use of a machine learning (ML) program, according to some example embodiments.

FIG. 6A is a block diagram 600A illustrating the training and use of a machine learning (ML) program 626, according to some example embodiments. In some example embodiments, machine-learning programs (MLPs), also referred to as machine-learning algorithms or tools, are utilized to perform operations associated with correlating data as well as generating and maintaining tables of automated rules, such as table 514, in connection with the autonomous home operation.

As illustrated in FIG. 6A, machine learning program training 624 can be performed based on training data 628. For example, the training data 628 can include one or more initial trigger graphs such as 516 and corresponding action graphs 524 that can be predefined (e.g., received from a cloud-based provider or generated by a user of the home communication network 100). During the machine learning program training 624, features 602 can be assessed based on the training data 628, for purposes of further training of the machine learning program. The machine learning program training 624 results in a trained machine learning program 626 which can include one or more classifiers 634 that can be used to provide assessments 632 based on new data 630. For example, after the trained ML program 626 is generated, new sensor data, actuator event data, and external data can be assessed by the trained ML program 626 to generate assessments 632. Assessment 632 can include correlations between different sensor data and actuator event data, which correlations can be used to generate a table of automated rules such as table 514. The machine learning program training 624 and the trained ML program 626 can be part of the AI engine 118.

In some aspects, the features 602 used during the machine learning program training 624 can include one or more of the following: sensor state data 604, . . . , 606 from a plurality of sensors 1, . . . , N; actuator event data 610, . . . , 612 for a plurality of actuators 1, . . . , K; external information source data 614, . . . , 616 from a plurality of external sources 1, L; timer data 608 associated with the sensor state data, the actuator event data, or the external information source data; user communications information 618; user data 620; and past user behavior data 622 (e.g., past user preferences, manual actuator adjustments, and so forth).

Machine learning is a field of study that gives computers the ability to learn without being explicitly programmed Machine learning explores the study and construction of algorithms, also referred to herein as tools, that may learn from existing data, may correlate data, and may make predictions about new data. Such machine-learning tools operate by building a model from example training data (e.g., 628) to make data-driven predictions or decisions expressed as outputs or assessments 632. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for correlating sensor data, actuator data, external data, and generating a table of automated rules in connection with the autonomous home operation.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide a correlation between sensor data, actuator data, and external data. The machine-learning algorithms utilize the training data 628 to find correlations among identified features 602 that affect the outcome.

The machine-learning algorithms utilize features 602 for analyzing the new data 630 to generate the assessments 632 (e.g., the data correlations of sensor data and actuator event data). Features 602 include individual measurable properties of a phenomenon being observed and used for training the ML program. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

The machine-learning algorithms utilize the training data 628 to find correlations among the identified features 602 that affect the outcome of assessments 632. In some example embodiments, the training data 628 includes labeled data, which is known data for one or more identified features 602 and one or more outcomes, such as a known trigger graph specifying sensor values, actuator events, and external information values, as well as a known action graph corresponding to the trigger graph specifying actuator events that will be performed automatically upon satisfying the conditions of the trigger graph.

With the training data 628 and the identified features 602, the machine-learning program is trained at operation 624. The result of the training is the trained machine-learning program 626. When the machine-learning program 626 is used to perform an assessment, new data 630 is provided as an input to the trained machine-learning program 626, and the machine-learning program 626 generates the assessments 632 as output.

Figure 6B:
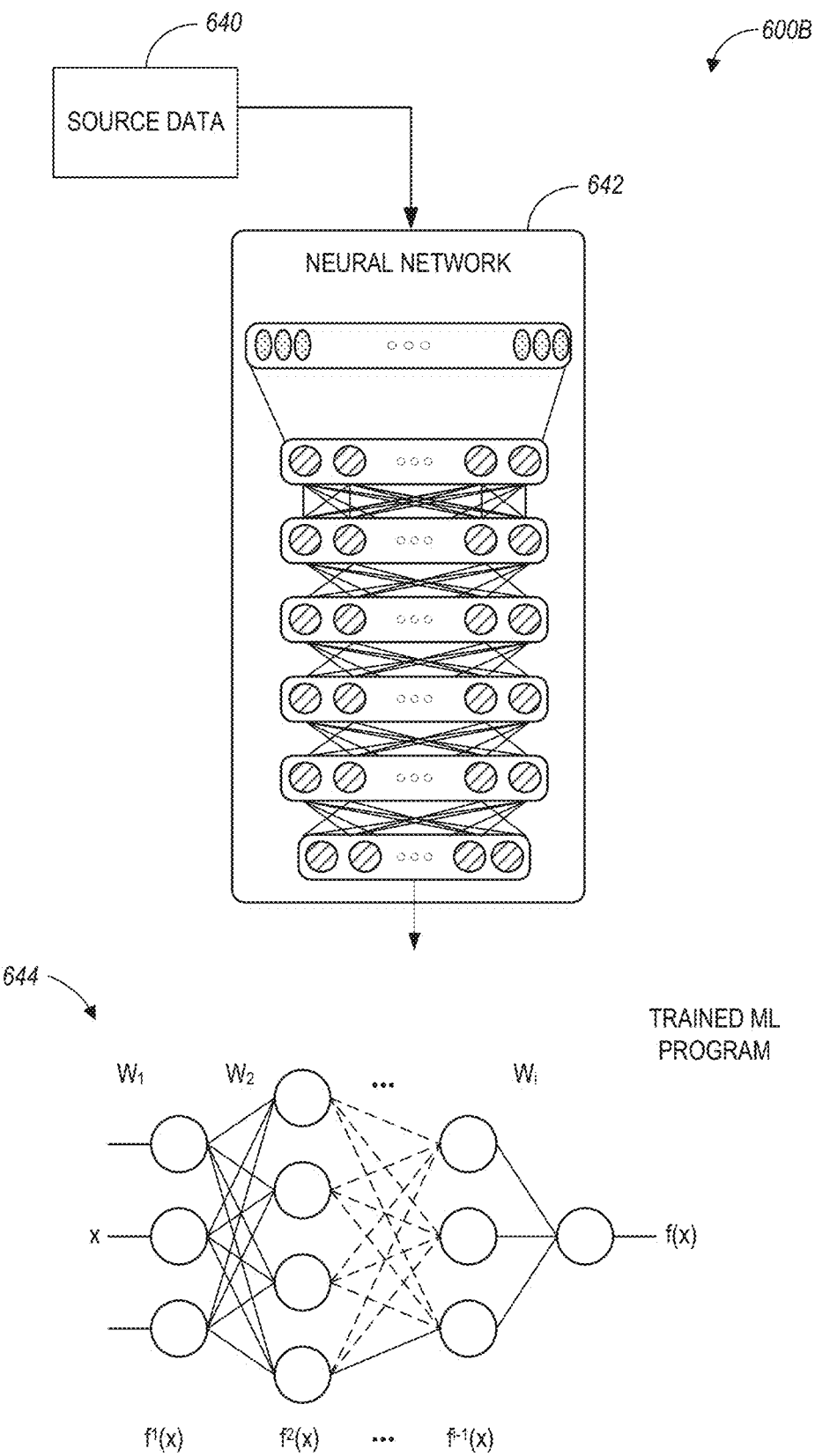
FIG. 6B is a diagram illustrating the generation of a trained ML program using a neural network, according to some example embodiments.

FIG. 6B is a diagram 600B illustrating the generation of a trained ML program 644 using a neural network 642, according to some example embodiments. Referring to FIG. 6B, source data 640 can be analyzed by a neural network 642 (or another type of machine-learning algorithm or technique) to generate the trained machine learning program 644 (which can be the same as the trained ML program 626). The source data 640 can include a training set of data, such as training data 628, as well as data identified by one or more of the features 602.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs (e.g., data 640) and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated, and the values of their variables are adjusted to attempt to better refine the model iteratively. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to the desired result, but as the training dataset may be varied, and is preferably very large, perfect accuracy and precision may not be achievable. Several epochs that make up a learning phase, therefore, may be set as a given number of trials or a fixed time/computing budget or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine the accuracy of the model in handling data that it has not been trained on. In a second example, a false positive rate or false-negative rate may be used to evaluate the models after finalization. In a third example, a delineation between data clusters in each model is used to select a model that produces the clearest bounds for its clusters of data.

In some example embodiments, the machine learning program 644 is trained by a neural network 642 (e.g., deep learning, deep convolutional, or recurrent neural network), which comprises a series of "neurons," such as Long Short Term Memory (LSTM) nodes, arranged into a network. A neuron is an architectural element used in data processing and artificial intelligence, particularly machine learning, that includes a memory that may determine when to "remember" and when to "forget" values held in that memory based on the weights of inputs provided to the given neuron. Each of the neurons used herein is configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance is related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted throughout a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network. Neural Networks.

A neural network 642, sometimes referred to as an artificial neural network, is a computing system based on consideration of biological neural networks of animal brains. Such systems progressively improve performance in performing tasks, which is referred to as learning, typically without task-specific programming. For example, in image recognition, a neural network may be taught to identify images that contain an object by analyzing example images that have been tagged with a name for the object and, having learned the object and name, may use the analytic results to identify the object in untagged images. A neural network is based on a collection of connected units called neurons, where each connection between neurons is called a synapse and can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplifies or dampens that input, which assigns significance to inputs for the task the algorithm is trying to learn. These input-weight products are summed, and the sum is passed through what is called a node's activation function, to determine whether and to what extent that signal progresses further through the network to affect the outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In the training of a DNN architecture, a regression, which is structured as a set of statistical processes for estimating the relationships among variables, can include minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as stochastic gradient descent (SGD) method.

The use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backward, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

As a result of the above-described training of the ML program 626 and generation of the table of automated rules 514, the AI engine 118 and device 108 can gradually take over the operation of some parts of the home communication network 100 after a certain amount of time required to achieve a certain level of accuracy of the trained ML program 626. However, the automated actions performed based on the table of automated rules 514 may not be accurate or to the liking of the user or the user's requirements. Additionally, user routine might change over time and hence the user may explicitly activate some actuators even though the system has recently activated the same actuators. If those device activations are in response to an automated action based on the table of automated rules 514, the AI engine 118 can consider the device activations a "correction action" to the automated action. In this regard, the device activations can be used by the trained ML program 626 to retrain or recalibrate itself as illustrated in FIG. 7, to make more accurate automated device operations in the future.

Figure 7:
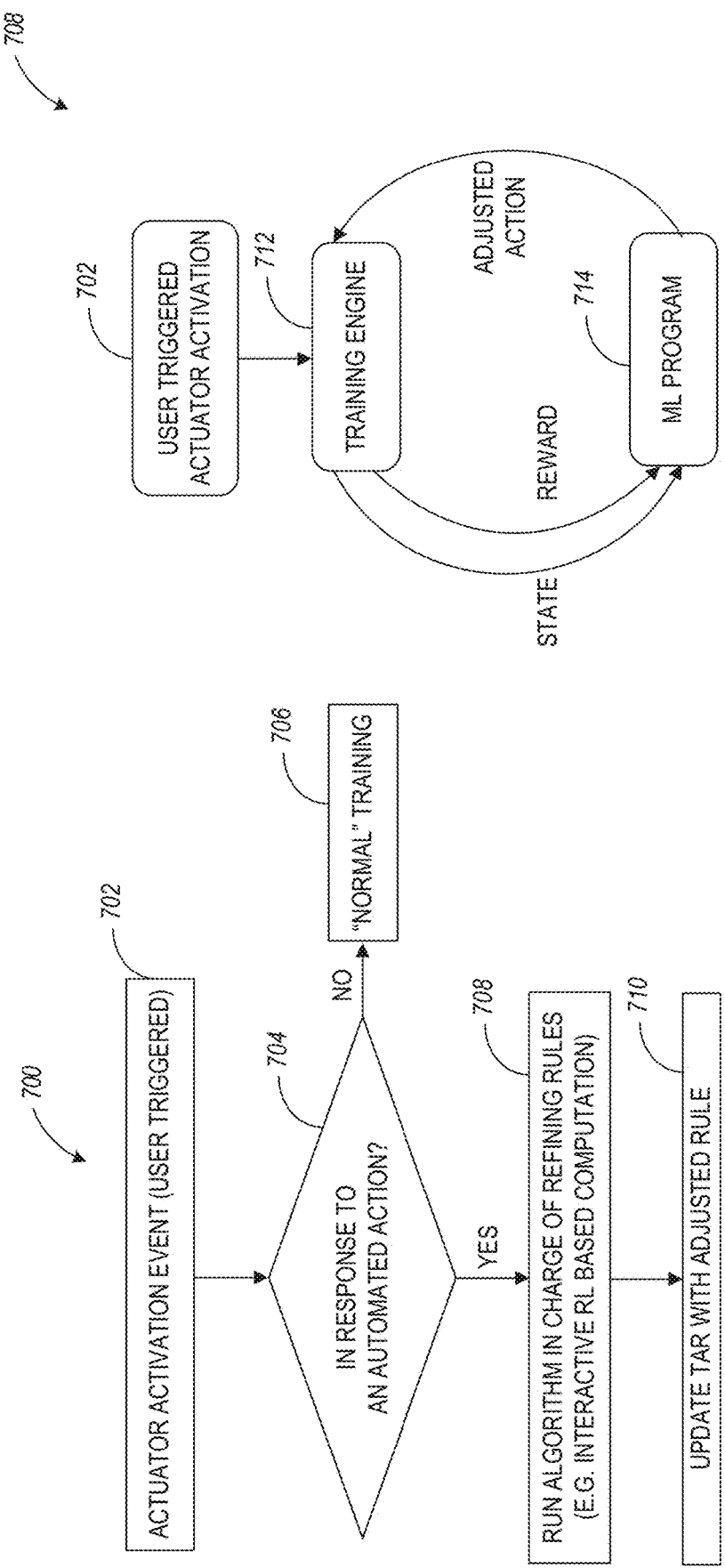
FIG. 7 is a flow diagram illustrating correction/retraining of a table of automated rules that can be used for the automated operation of network devices, according to some example embodiments.

FIG. 7 is a flow diagram illustrating a correction/retraining process 700 of a table of automated rules that can be used for automated operation of network devices, according to some example embodiments. Referring to FIG. 7, the correction/retraining process 700 can be performed by the AI engine 118 and can start at operation 702 when an actuator activation event can be detected where the actuator activation event is triggered by a user. In some aspects, the actuator activation event can be triggered by a user after a certain time of a different actuator event that was automatically triggered based on a table of automated rules.

Once a user triggers actuator activation within a certain timeframe after an automated action takes place, at operation 704 it can be determined if the user triggered actuator activation event is in response to an automated action such as an actuator event automatically triggered based on a table of automated rules. At operation 708, if it is determined that the user-triggered actuator activation event is in response to an automated action defined by the table of automated rules, the AI engine 118 can call the functions and run an algorithm that can be executed during a retraining process, that will refine the rules of the table of automated rules 514 for more accurate future operation and will update the table of automated rules with adjusted rules at operation 710.

The right side of FIG. 7 illustrates in greater detail operation 708 for retraining the ML program 626 and refining the table of automated rules 514. The re-training process for the ML program 626 starts once a user-triggered actuator activation 702 is detected as a response to an automated action performed by the system. The training engine 712, which can be part of the AI engine 118, can use the actuator activation performed by the user, and based on the amount of change required for completing the actuator activation initiated by the user, the training engine 712 can create a reward (starting with a negative reward value) to make the ML program 714 change its behavior closer to the desired action. As a response, the ML program 714 will output an adjusted action that it would take the next time under the same trigger circumstances. The training engine 712 evaluates the adjusted action and outputs a new reward function and a state the emulated environment would be in as a result of the adjusted action. This process can continue until the adjusted action created by the ML program 714 is within a certain threshold of the desired action determined by the training engine 712 based on the user's activation 702.

Figure 8:
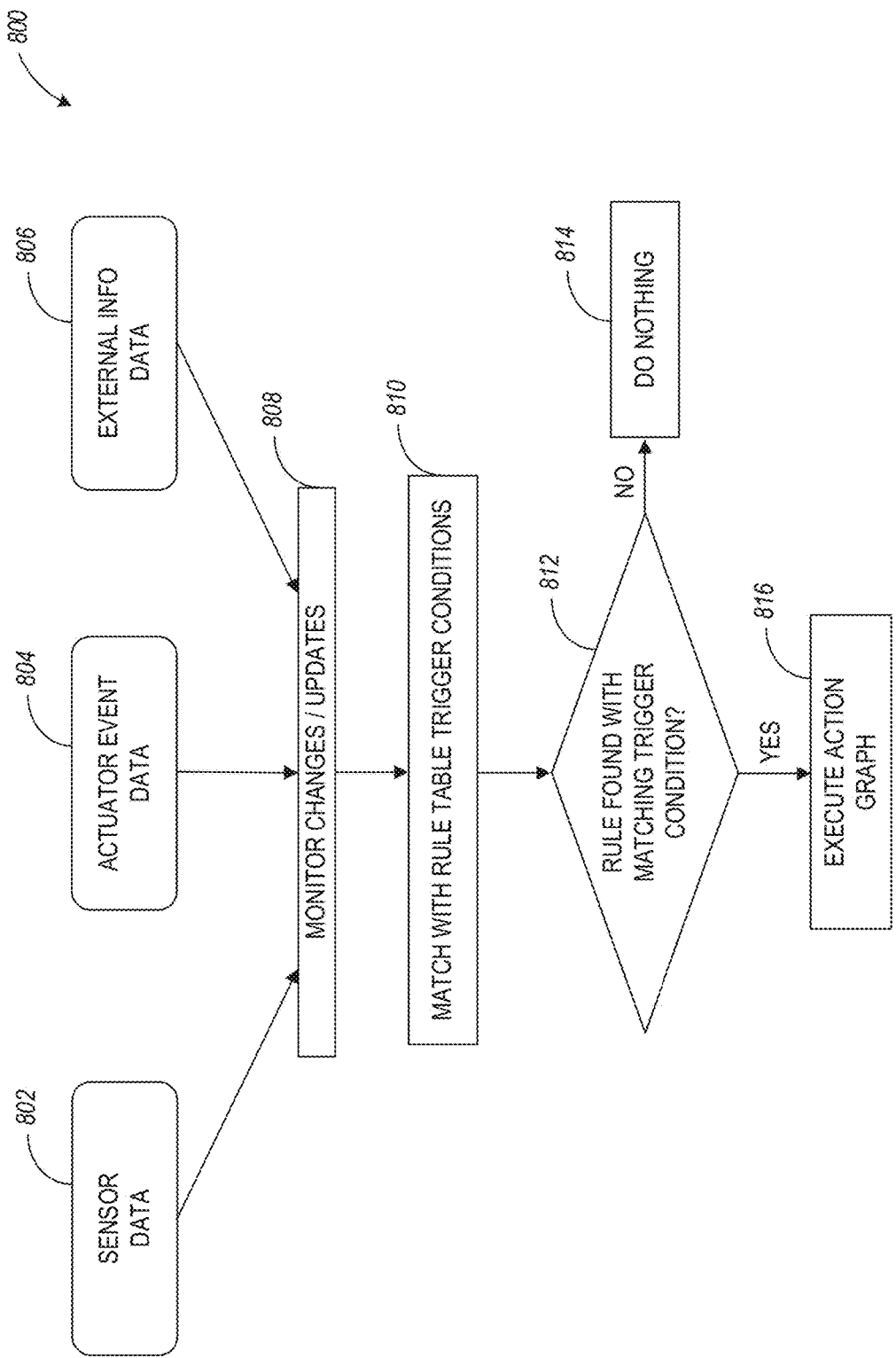
FIG. 8 is a flow diagram illustrating the execution of an action graph from a table of automated rules based on the matching of trigger conditions, according to some example embodiments.

FIG. 8 is a flow diagram illustrating a process 800 of inference and execution of an action graph from a table of automated rules based on the matching of trigger conditions, according to some example embodiments. The functionalities illustrated in FIG. 8 can be performed by a table of automated rules generation and management module (e.g., 1462 in FIG. 14 or 1565 in FIG. 15) or by another module within the device 108.

Referring to FIG. 8, sensor data 802, actuator event data 804, and external data 806 can be continuously monitored for changes or updates at operation 808. Upon detection of such changes or updates, at operation 810, the monitor data can be matched with one or more trigger conditions specified within a trigger graph in the table of automated rules 514. At operation 812, it can be determined whether a rule with the matching trigger conditions is found within the table of automated rules 514. If such a rule is located with matching trigger conditions in a trigger graph within the table of automated rules, at operation 816, a corresponding action graph to the located trigger graph can be executed. If such a rule is not located within the table of automated rules, at operation 814, processing can conclude without any actuator activations.

Figure 9A:
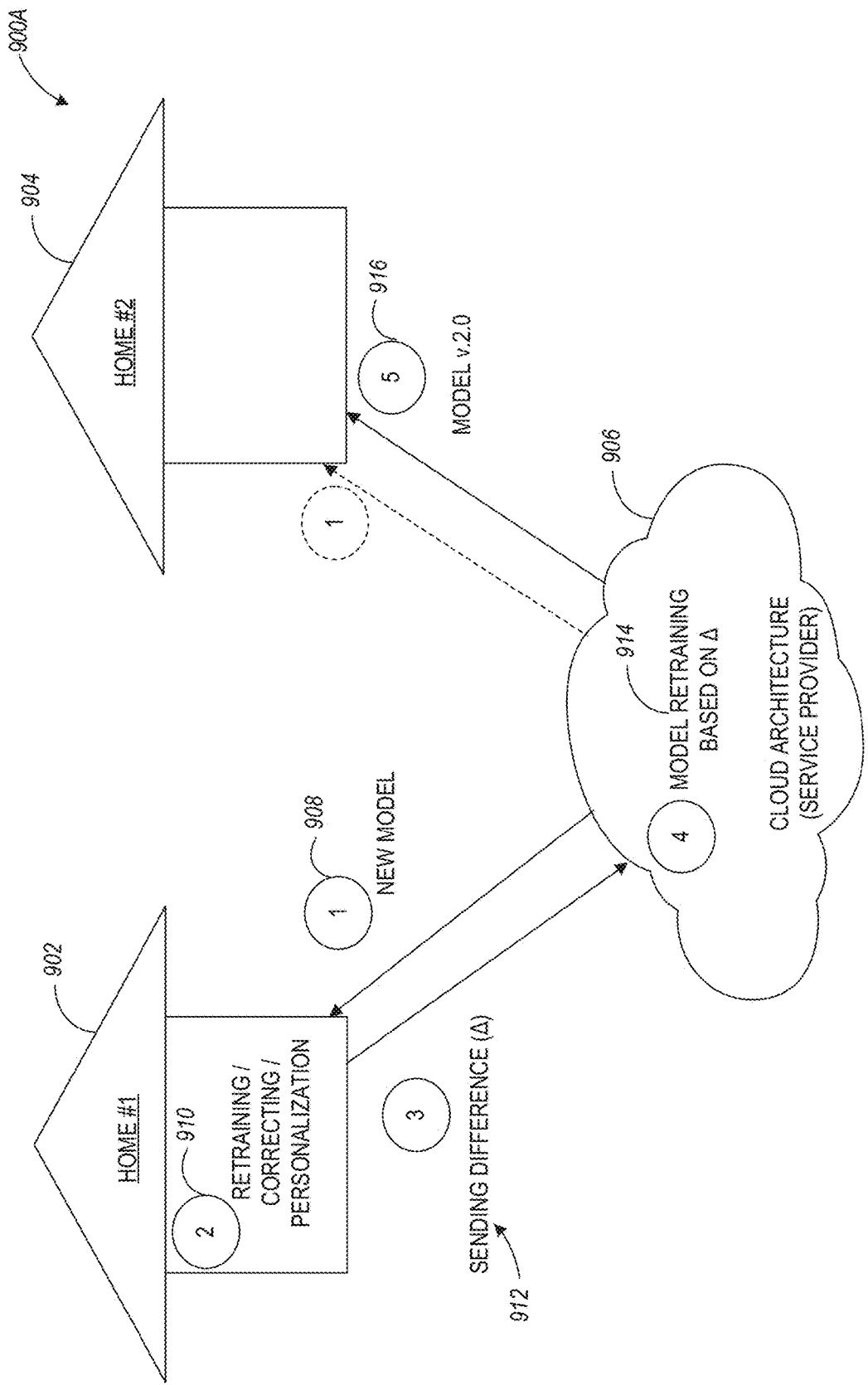
FIG. 9A, FIG. 9B, and FIG. 9C illustrate various approaches for federated computation in connection with the automated operation of network devices in one or more homes, according to some example embodiments.
Figure 9B:
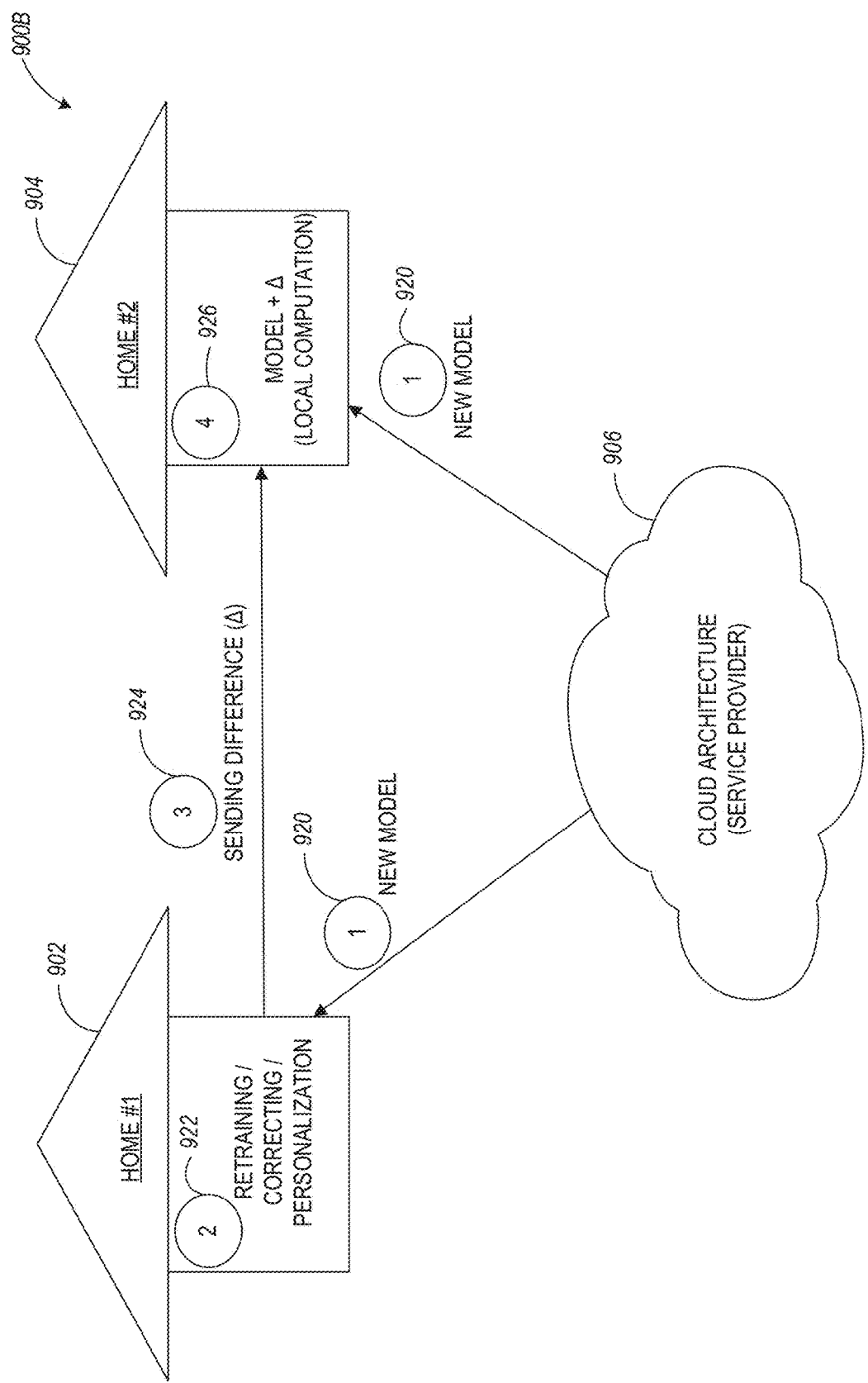
Figure 9C:
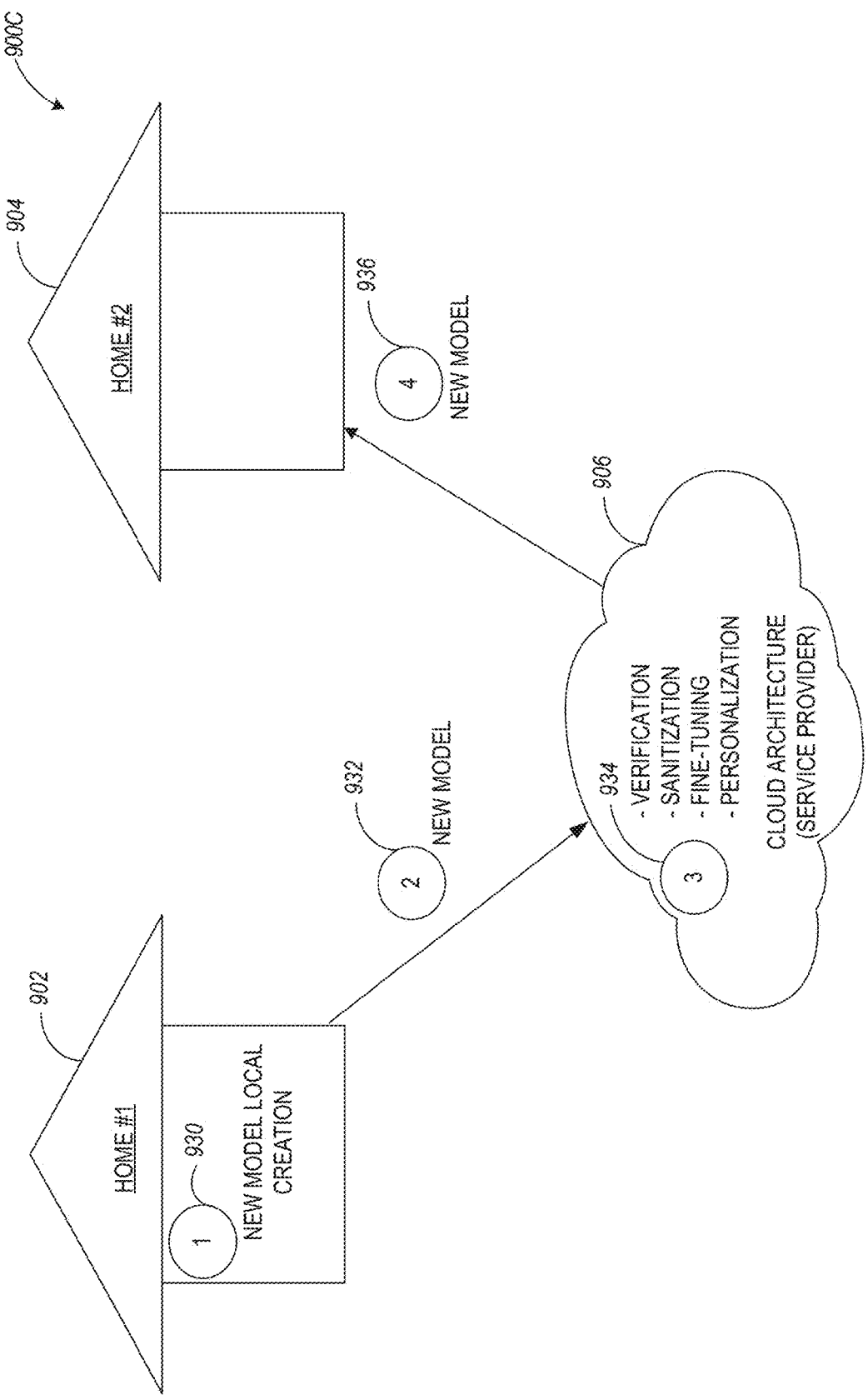

In some aspects, techniques disclosed herein can be used to support learning activities and user habits in a federated fashion across multiple home locations as well as a cloud architecture. More specifically, rules or models, such as tables of automated rules created by one household can be passed to another to speed up or even eliminate the learning or relearning process, as well as to increase the accuracy of the rules and the ML models used to generate the tables. FIG. 9A, FIG. 9B, and FIG. 9C illustrate various approaches for federated computation in connection with the automated operation of network devices in one or more homes, according to some example embodiments. FIG. 9A illustrates embodiments 900A where a service provider (e.g. cloud architecture 906) communicates a new model 908 to household 902. As used herein, the term "model" indicates a trained machine learning program that can be used for generating a table of automated rules. At home 902, the new model 90 weight can be retrained/corrected at operation 910 based on the actuator activations triggered by occupants of household 902. In aspects when no initial model was provided by the service provider 906, a new model can be generated by household 902. At operation 912, household 902 can communicate its newly built model, or the difference between the initial model supplied by provider 906 and the result of its retrained model, to the service provider 906. Provider 906 can perform further computations at operation 914, such as adjusting its initial model based on the differences provided by household 902, sanitizing or removing some parts of the model, and ultimately communicates the adjusted model 916 to household 904 for adoption.

FIG. 9B illustrates a different embodiment 900B where households can provide updates to other households in a more direct fashion, excluding the service provider. Referring to FIG. 9B, a new model 920 can be communicated by the service provider 906 to household 902 and household 904. Retraining/correction can be performed at operation 922 within household 902. At operation 924, household 902 can communicate a newly built model, or the difference between the initial model and a retrained model, to household 904. At operation 926, computing resources at household 904 can perform a local computation of a model for automating devices within a home communication network based on the initial model 920 received from the service provider 906 as well as the difference between models communicated by household 902 at operation 924.

FIG. 9C illustrates an embodiment 900C where household 902 generates a new model 930 at its premises and shares it, at operation 932, with the service provider 906. The service provider 906 can perform additional processing 934 (e.g., verification, sanitization, fine-tuning, and personalization) in connection with the received model, to generate an updated model 936. The service provider 906 can then share the updated model 936 with a different household, such as household 904.

Figure 10:
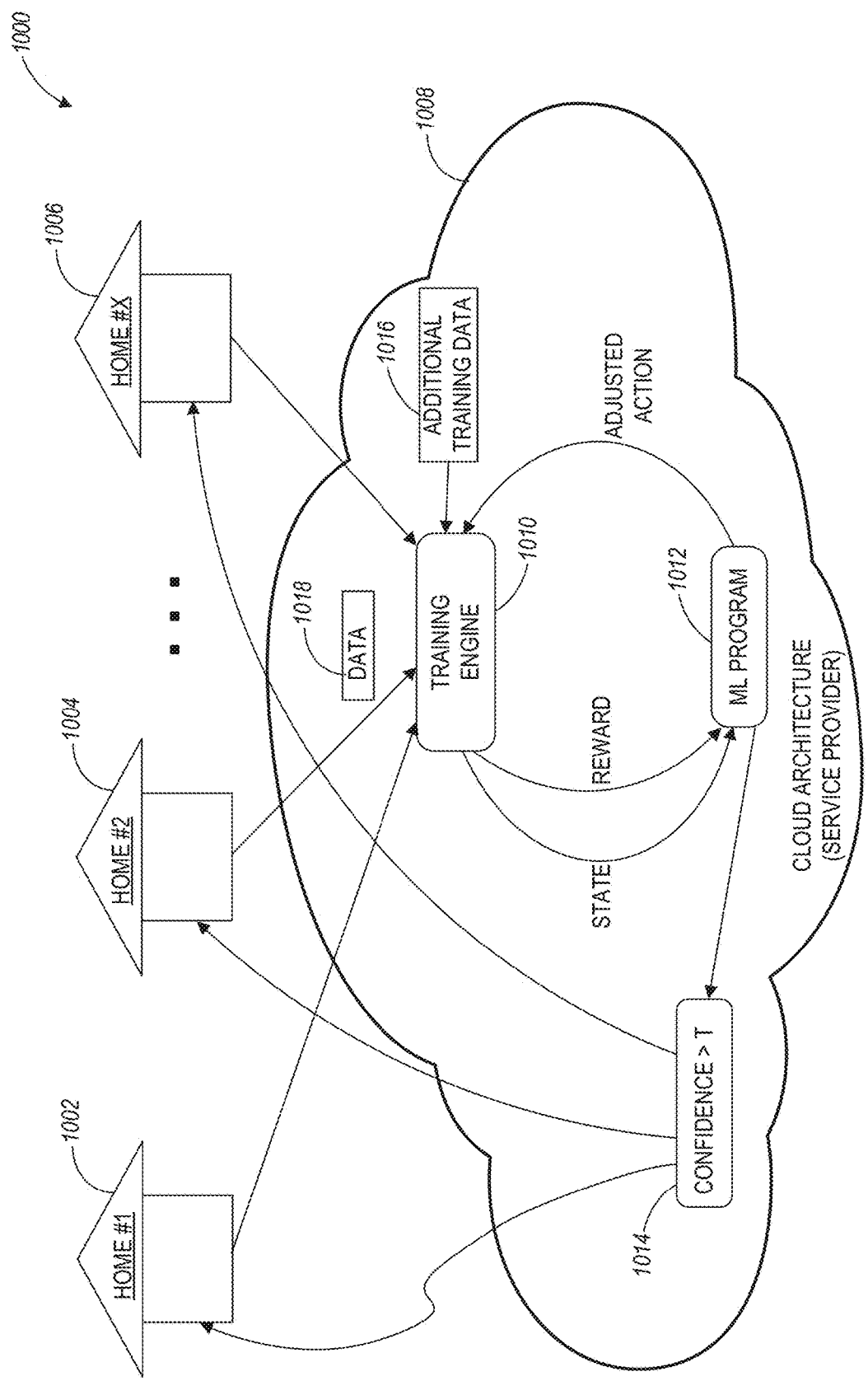
FIG. 10 illustrates a communication architecture with multiple homes and cloud-based ML training and generation of a table of automated rules, according to some example embodiments.

FIG. 10 illustrates a communication architecture 1000 with multiple homes and cloud-based ML training and generation of a table of automated rules, according to some example embodiments. Referring to FIG. 10, data 1018 from multiple households 1002, 1004, . . . , 1006 is communicated to the service provider 1008 (e.g., a cloud-based architecture) so that training and ML program creation is performed by the service provider 1008. Data 1018 can include sensor data, user activation event data, external data, and so forth, and can be used by individual households for purposes of generating a table of automated rules by the trained ML program. In some aspects, the service provider 1008 can preprocess the data, such as sanitize it before it is used by the training engine 1010. The training engine 1010 can rely exclusively on the data 1018 from the households or can also use additional data 1016 provided by the service provider as synthetic data for purposes of training the ML program 1012. During the training process, the service provider 1008 can validate the accuracy or confidence level of the trained model (i.e., ML program 1012) and can only send the trade model to one or more of the households for prediction and generation of a table of automated rules at the individual household locations once the trained model has reached a confidence 1014 above a threshold.

Figure 11A:
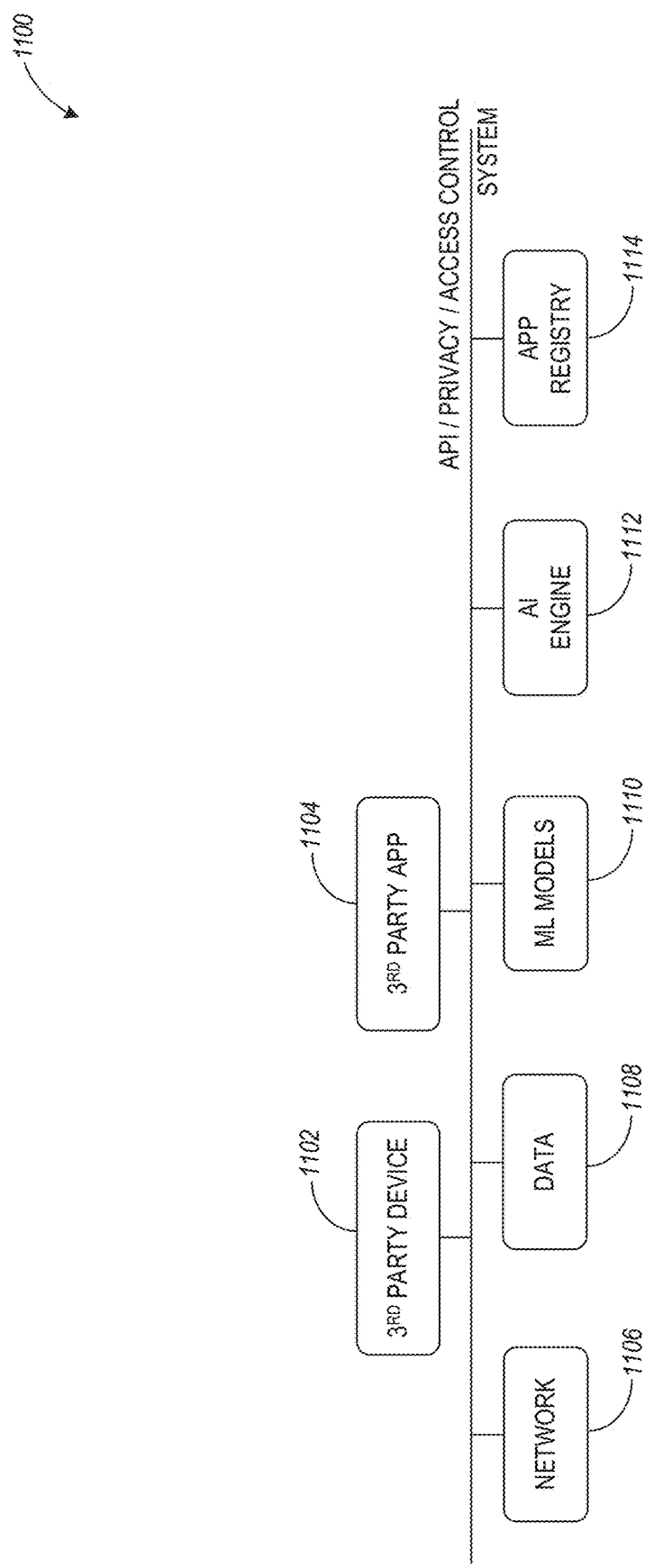
FIG. 11A and FIG. 11B illustrate block diagrams of a third-party device and a third-party application connection to a home communication network such as the network of FIG. 1, according to some example embodiments.
Figure 11B:
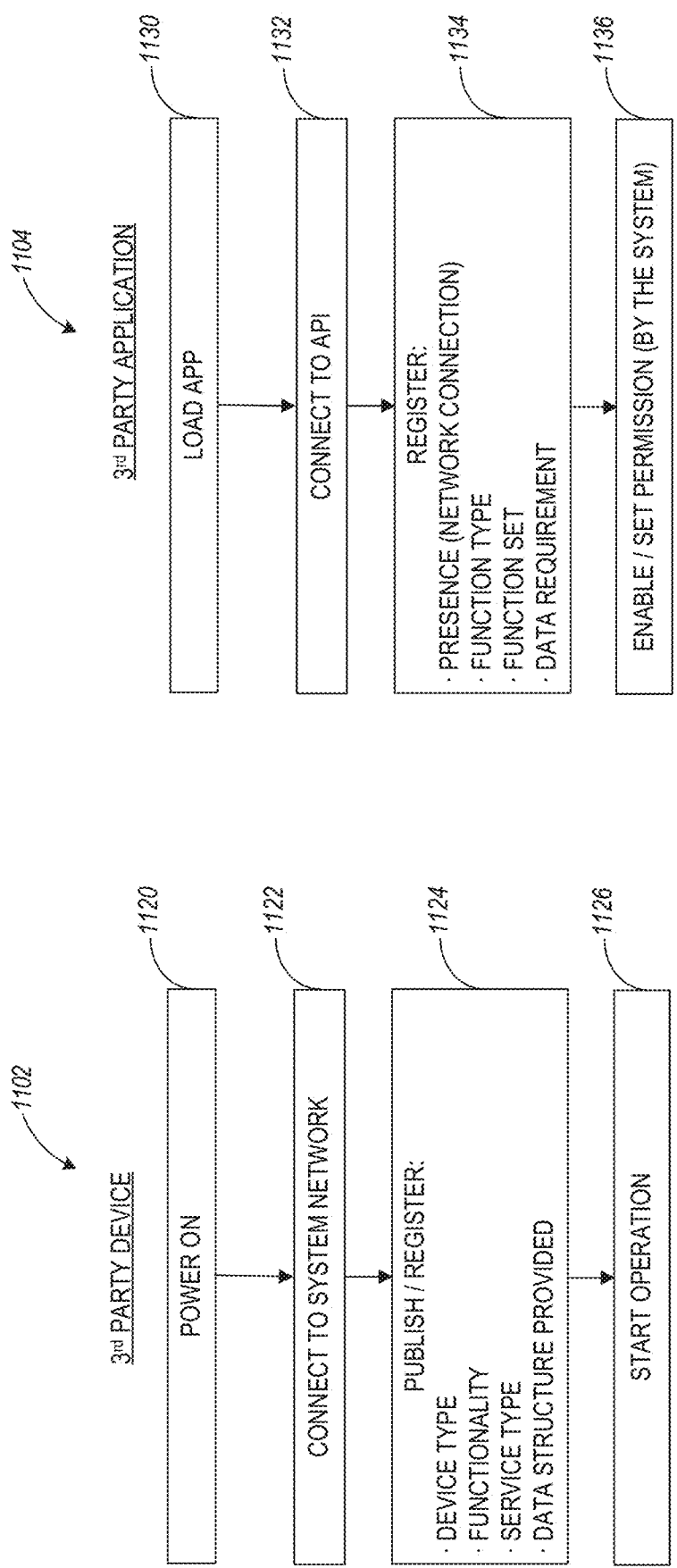

FIG. 11A and FIG. 11B illustrate block diagrams of a third-party device and a third-party application connection to a home communication network such as the network of FIG. 1, according to some example embodiments. Referring to FIG. 11A, diagram 1100 illustrates a third-party device 1102 and a third-party application 1104 connecting to a home communication network such as network 100. For example, the third-party device 1102 and a third-party application 1104 can connect to the home communication network 100 via API 302. In this regard, the third-party device 1102 and a third-party application 1104 can access network resources 1106, data 1108, machine learning models 1110, AI engine 1112, and application registry 1114 which can be maintained within the home communication network in connection with configuring home automation functionalities discussed herein.

In some aspects, third-party device 1102 can include additional sensors or actuators that collect and send data within the home communication network. The third-party application 1104 can utilize data and knowledge available within the home communication network to provide value-added services on top of it (e.g., by providing enhanced AI capabilities to some parts or the entire AI engine). In such cases, a home communication network can be configured to provide some of the services and resources it has available, such as network connection to the other components of the network (i.e., sensors, actuators, data storage, compute engine, etc.), access to some parts of the data, access to trained AI models, access to compute resources as well as access to bookkeeping components, such as application registry 1114.

FIG. 11B illustrates state diagrams associated with an example embodiment of a third-party device and third-party application installation and registration processes. For the third-party device 1102, the first step 1120 includes powering ON the device either through connecting them to an external power source or activating its power source. At operation 1122, the device can be connected to the home communication network to be able to communicate with the rest of the network. At operation 1124, the device 1102 can publish information about itself and can register for services provided within the home communication network 100. Information being published about the device may include a description of the device and the data it provides during operation, such as device type, functionality, service type, data types, and structure. At operation 1126, the third-party device 1102 can start operating within the home communication network 100.

The registration process for the third-party application 1104 can start at operation 1130 when the application is loaded onto the appropriate component within the home communication network, e.g., application execution engine, followed by connecting the application to the network (at operation 1132) through API(s) such as API 302. At operation 1134, the third-party application 1104 registers certain information with the home communication network 100, such as function type of one or more functions that can be performed by the application, a function set, data requirements, and so forth. At operation 1136, the home communication network can enable and set various permissions associated with the application 1104.

Figure 12A:
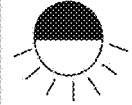
FIG. 12A illustrates a user interface representing a table of automated rules, according to some example embodiments.

Even though the objective of the home communication network 100 and the AI engine 118 is to operate fully autonomously in connection with providing home automation, without requiring any human intervention (apart from installing and launching the necessary system components during initial system installation of the AI engine and the training set), the device 108 can be configured to provide an overview and/or explain the knowledge and/or rules it has learned during its operation. This information might be provided to the user 112 one or more user interfaces (e.g., home network device display, a mobile phone application, web service, etc.). The information being provided to the user may include the sensor values and actuator events that trigger the rules as well as the description of the rules within the table of automated rules, such as what automated actions are being taken when a certain rule is triggered. In addition, the system might provide statistical information on what time the rule might be fired with what probability (e.g., based on prior automatic execution of actuator events from the table of automated rules). FIG. 12A illustrates a user interface 1200A representing a table of automated rules, according to some example embodiments. For example, when an outside light sensor has a sensor reading of "4" for light intensity and the time of day is within the indicated ranges, an actuator event for turning on a dining light can be activated. Another trigger graph can be based on the outside temperature being lower than 60° F. and the time of day being within the indicated ranges, resulting in an actuator of the event execution (e.g., turning thermostat and house heat to 72° F.) from a corresponding action graph.

Figure 12B:
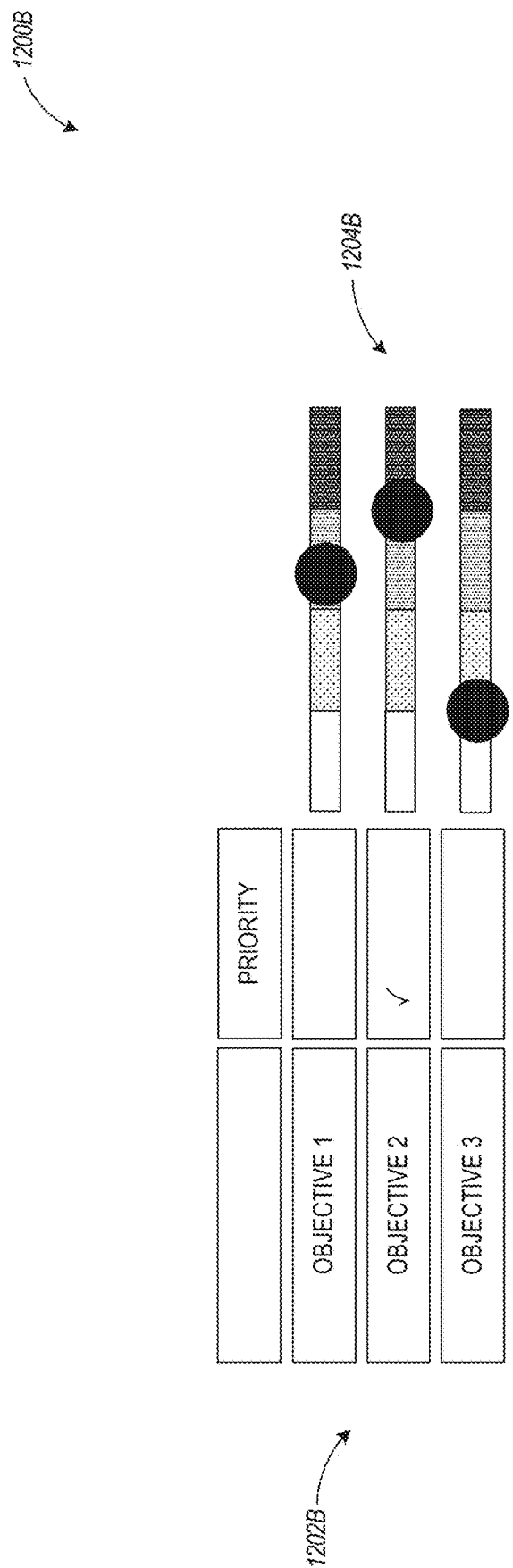
FIG. 12B illustrates a user interface for setting user objectives in connection with the automated operation of network devices, according to some example embodiments.

In addition to providing information about what the AI engine 118 has learned, device 108 can also provide an interface for the user to set objectives about how the AI engine 118 should tune its decisions. These objectives might be related to security, comfort, energy savings, etc. FIG. 12B illustrates user interfaces 1200B for setting user objectives (e.g. objectives 214) in connection with the automated operation of network devices, according to some example embodiments. In one embodiment, the user might use interface 1202B only to specify the objective with the highest criteria, while in another embodiment and in connection with user interface 1204B, the user might set a level of importance for each objective.

Figure 12C:
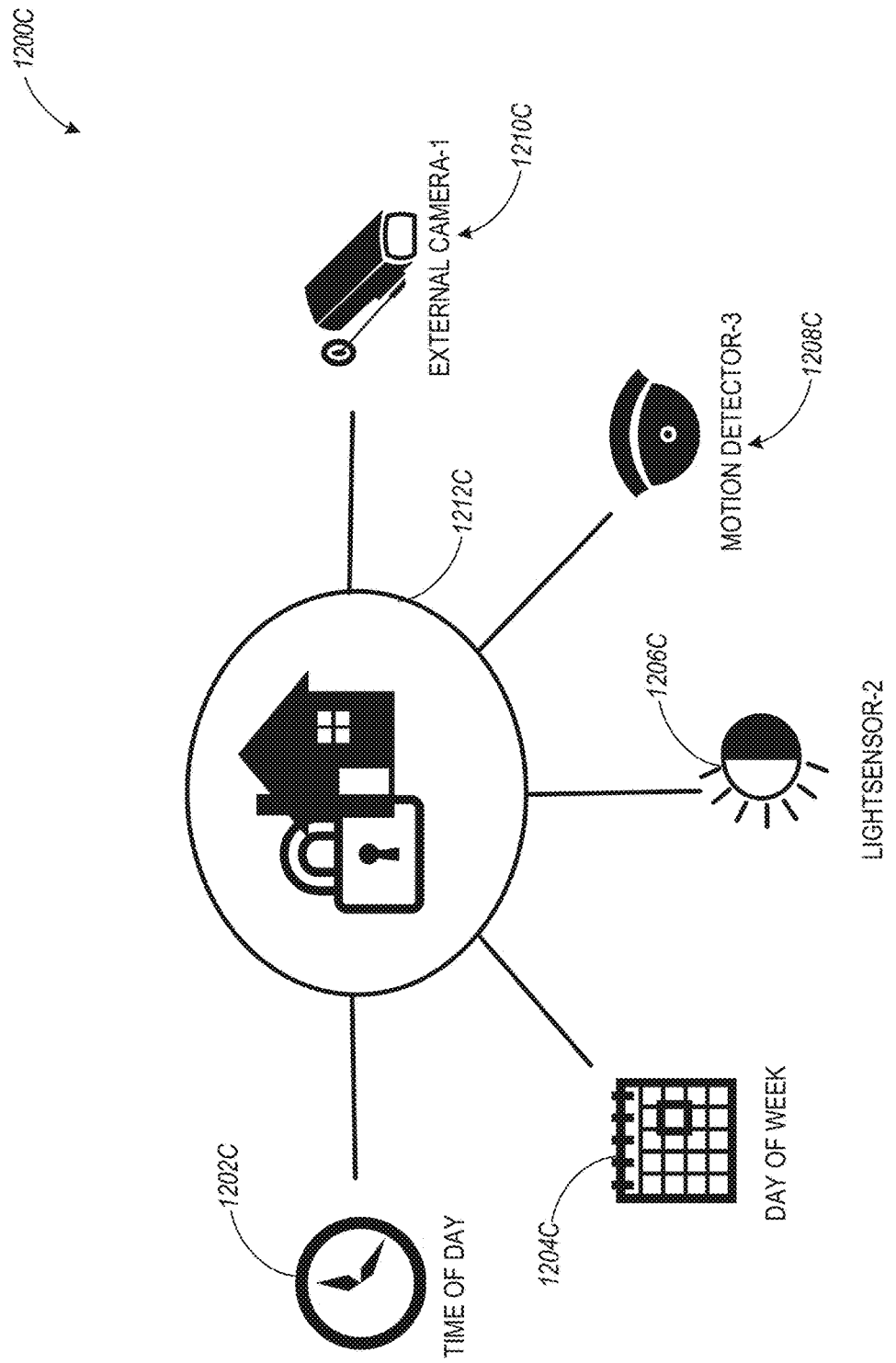
FIG. 12C illustrates a user interface for setting sensor-actuator grouping in connection with the automated operation of network devices, according to some example embodiments.

In addition to specifying the objectives for the AI engine 118, the user may also provide information about the relationship between sensors and actuators (e.g., information 216). This grouping information can be used by the training subsystem (e.g., the AI engine management module 1464 1560) to create more accurate models or complete training in a shorter time. The provided information might include a logical or physical connection between different sensors and actuators. Logical connections can include them being in the same physical location (i.e., a room) or relating to the same service (i.e., heating a home). The physical connection can mean that they are physically connected for direct communication or cooperation to collectively perform some functionality or service. FIG. 12C illustrates a user interface for setting a sensor-actuator grouping 1200C in connection with the automated operation of network devices, according to some example embodiments. For example, a home security system 1212C can be configured in the same grouping with a time sensor 1202C, day of the week sensor 1204C, a light sensor 1206C, a motion detector 1208C, and external camera 1210C.

Figure 12D:
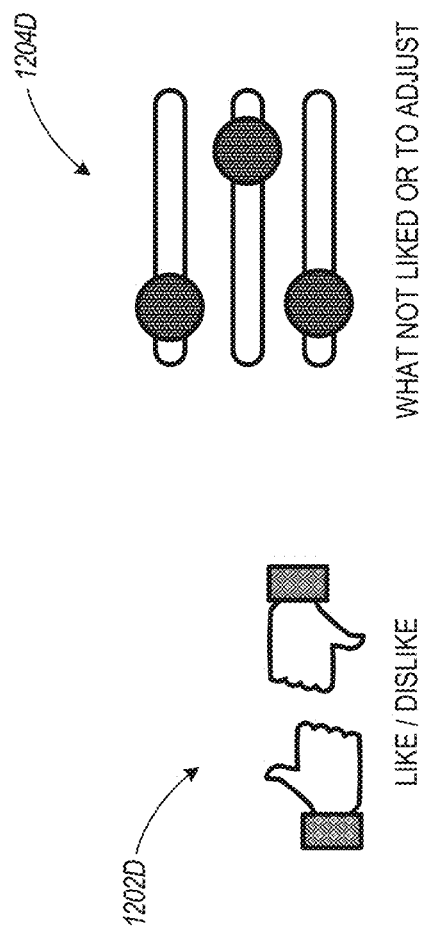
FIG. 12D illustrates a user interface for providing feedback to actuator actions executed based on a table of automated rules, according to some example embodiments.

An additional approach for obtaining input from the user to aid accuracy and speed of training can be through accepting "like" or "don't like" type of feedback. Such feedback can be collected through traditional user interfaces or voice control. The feedback can be used to direct training towards more accurate prediction, thereby achieving better prediction capabilities within a shorter time. In addition to requesting/accepting "like" and "don't like" type feedback, a user may also specify details about what they liked or not liked and how the system might correct the action (e.g. raise temperature more than it was done during the previous automated action). FIG. 12D illustrates user interface 1202D and 1204D for providing feedback to actuator actions executed based on a table of automated rules, according to some example embodiments.

Figure 13:
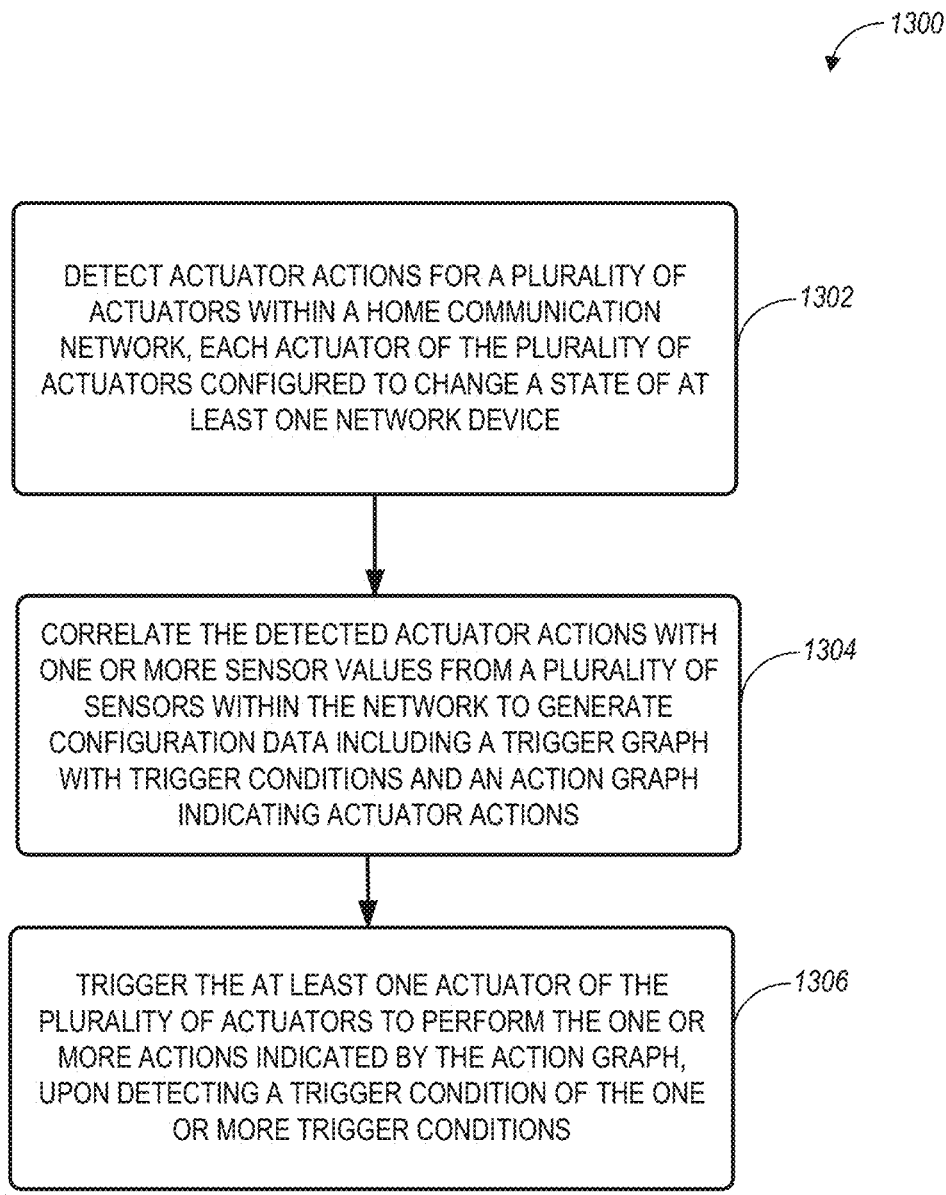
FIG. 13 is a flowchart of a method suitable for the automated operation of network devices within a home communication network, according to some example embodiments.

FIG. 13 is a flowchart of a method suitable for the automated operation of network devices within a home communication network, according to some example embodiments. Method 1300 includes operations 1302, 1304, and 1306. By way of example and not limitation, the method 1300 is described as being performed by the device 108 using the modules 1460-1464 of FIG. 14 (or modules 1560, 1565, and 1570 of FIG. 15). At operation 1302, actuator actions for a plurality of actuators (e.g., 104) are detected within a home communication network (e.g., 100). Each actuator of the plurality of actuators can be configured to change a state of at least one network device within the home communication network. At operation 1304, the detected actuator actions can be correlated with one or more sensor values from a plurality of sensors within the home communication network to generate configuration data. For example, the trained ML program 626 can correlate actuator event data 504 with sensor data 502 from the plurality of sensors 102 to generate the configuration data (e.g., table of automated rules 514). The configuration data (e.g., table 514) can include a trigger graph (e.g., 516) with one or more trigger conditions (e.g., 518—522). The configuration data can also include an action graph (e.g., 524) corresponding to the trigger graph (e.g., 516). The action graph can indicate one or more actuator actions (e.g., 526A-526G) associated with at least one of the plurality of actuators (e.g., 104). At operation 1306, upon detecting a trigger condition of the one or more trigger conditions in the trigger graph, the at least one actuator of the plurality of actuators is triggered to perform the one or more actions indicated by the action graph.

FIG. 14 is a block diagram illustrating a representative software architecture 1400, which may be used in conjunction with various device hardware described herein, according to some example embodiments. FIG. 14 is merely a non-limiting example of a software architecture 1402 and it will be appreciated that many other architectures may be implemented to facilitate the functionality described herein. The software architecture 1402 may be executing on hardware such as device 1500 of FIG. 15 that includes, among other things, processor 1505, memory 1510, storage 1515 and 1520, and I/O components 1525 and 1530. A representative hardware layer 1404 is illustrated and can represent, for example, the device 1500 of FIG. 15. The representative hardware layer 1404 comprises one or more processing units 1406 having associated executable instructions 1408. Executable instructions 1408 represent the executable instructions of the software architecture 1402, including implementation of the methods, modules, and so forth of FIGS. 1-13. Hardware layer 1404 also includes memory and/or storage modules 1410, which also have executable instructions 1408. Hardware layer 1404 may also comprise other hardware 1412, which represents any other hardware of the hardware layer 1404, such as the other hardware illustrated as part of device 1500.

In the example architecture of FIG. 14, the software architecture 1402 may be conceptualized as a stack of layers where each layer provides particular functionality. For example, the software architecture 1402 may include layers such as an operating system 1414, libraries 1416, frameworks/middleware 1418, applications 1420, and presentation layer 1444. Operationally, the applications 1420 and/or other components within the layers may invoke application programming interface (API) calls 1424 through the software stack and receive a response, returned values, and so forth illustrated as messages 1426 in response to the API calls 1424. The layers illustrated in FIG. 14 are representative in nature and not all software architectures 1402 have all layers. For example, some mobile or special purpose operating systems may not provide a framework/middleware 1418, while others may provide such a layer. Other software architectures may include additional or different layers.

The operating system 1414 may manage hardware resources and provide common services. The operating system 1414 may include, for example, a kernel 1428, services 1430, drivers 1432, an AI engine management module 1460, table of automated rules (TAR) generation and management module 1462, and a data collection and management module 1464. The kernel 1428 may act as an abstraction layer between the hardware and the other software layers. For example, kernel 1428 may be responsible for memory management, processor management (e.g., scheduling), component management, networking, security settings, and so on. The services 1430 may provide other common services for the other software layers. The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

In some aspects, the AI engine management module 1460 can include suitable circuitry, logic, interfaces, and/or code and can be configured to perform functionalities described herein in connection with the AI engine 118, such as ML program training, generation of a trained ML program, re-training a trained ML program (e.g., as described in FIG. 7), and managing federated functionalities in connection with a trained ML program (e.g., as described in connection with FIGS. 9A-9C). The TAR generation and management module 1462 can include suitable circuitry, logic, interfaces, and/or code and can be configured to perform functionalities associated with a TAR, such as generating a TAR (e.g., 514) using a trained ML program (e.g., 626), monitoring sensor values to detect a match with a trigger graph within a TAR, and executing one or more actuator events specified by a corresponding action graph within the TAR (e.g., as described in connection with FIG. 8). The data collection and management module 1464 can include suitable circuitry, logic, interfaces, and/or code and can be configured to perform data-related functions, such as data collection (e.g., as performed by modules 402 and 510), data processing (e.g., as performed at data processing 404 and 422), and data storage (e.g., as performed at operation 406 and by module 508). In some aspects, one or more of the modules 1460, 1462, and 1464 can be combined into a single module.

The libraries 1416 may provide a common infrastructure that may be utilized by the applications 1420 and/or other components and/or layers. The libraries 1416 typically provide functionality that allows other software modules to perform tasks more easily than to interface directly with the underlying operating system 1414 functionality (e.g., kernel 1428, services 1430, drivers 1432, and/or modules 1460-1464). The libraries 1416 may include system libraries 1434 (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks/middleware 1418 (also sometimes referred to as middleware) may provide a higher-level common infrastructure that may be utilized by the applications 1420 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1420 and/or other software components/modules, some of which may be specific to a particular operating system 1414 or platform.

The applications 1420 include built-in applications 1440 and/or third-party applications 1442. Examples of representative built-in applications 1440 may include but are not limited to, a contacts application, a browser application, a book reader application, a location application, a media application, a messaging application, and/or a game application. Third-party applications 1442 may include any of the built-in applications 1440 as well as a broad assortment of other applications. In a specific example, the third-party application 1442 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 942 may invoke the API calls 1424 provided by the mobile operating system such as operating system 1414 to facilitate functionality described herein.

The applications 1420 may utilize built-in operating system functions (e.g., kernel 1428, services 1430, drivers 1432, and/or modules 1460-1464), libraries (e.g., system libraries 1434, API libraries 1436, and other libraries 1438), and frameworks/middleware 1418 to create user interfaces to interact with users of the system. Alternatively, or additionally, in some systems, interactions with a user may occur through a presentation layer, such as presentation layer 1444. In these systems, the application/module "logic" can be separated from the aspects of the application/module that interact with a user.

Some software architectures utilize virtual machines. In the example of FIG. 14, this is illustrated by virtual machine 1448. A virtual machine creates a software environment where applications/modules can execute as if they were executing on a hardware machine (such as the device 1500 of FIG. 15, for example). A virtual machine 1448 is hosted by a host operating system (operating system 1414 in FIG. 14) and typically, although not always, has a virtual machine monitor 1446, which manages the operation of the virtual machine 1448 as well as the interface with the host operating system (i.e., operating system 1414). A software architecture 1402 executes within the virtual machine 1448 such as an operating system 1450, libraries 1452, frameworks/middleware 1454, applications 1456, and/or presentation layer 1458. These layers of software architecture executing within the virtual machine 1448 can be the same as corresponding layers previously described or may be different.

FIG. 15 is a block diagram illustrating circuitry for a device that implements algorithms and performs methods, according to some example embodiments. All components need not be used in various embodiments. For example, clients, servers, and cloud-based network devices may each use a different set of components, or in the case of servers, larger storage devices.

One example computing device in the form of a computer 1500 (also referred to as computing device 1500, computer system 1500, or computer 1500) may include a processor 1505, memory storage 1510, removable storage 1515, non-removable storage 1520, input interface 1525, the output interface 1530, and communication interface 1535, all connected by a bus 1540. Although the example computing device is illustrated and described as the computer 1500, the computing device may be in different forms in different embodiments.

The memory storage 1510 may include volatile memory 1545 and non-volatile memory 1550 and may store a program 1555. The computer 1500 may include—or have access to a computing environment that includes—a variety of computer-readable media, such as the volatile memory 1545, the non-volatile memory 1550, the removable storage 1515, and the non-removable storage 1520. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 1555 stored in the memory 1510) are executable by the processor 1505 of the computer 1500. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example. As used herein, the terms "computer-readable medium" and "machine-readable medium" are interchangeable.

Program 1555 may utilize a customer preference structure using modules discussed herein, such as an AI management module 1560, a TAR generation and management module 1565, and a data collection and management module 1570. The AI management module 1560, the TAR generation and management module 1565, and the data collection and management module 1570 may be the same as the AI management module 1460, the TAR generation and management module 1462, and the data collection and management module 1464, respectively, as discussed in connection with FIG. 14.

In an example embodiment, the computer 1500 includes a detector module detecting actuator actions for a plurality of actuators within the home communication network, each of the plurality of actuators configured to change a state of at least one of the network devices, a correlation module correlating the detected actuator actions with one or more sensor values from a plurality of sensors within the home communication network to generate configuration data, the configuration data comprising a trigger graph with one or more trigger conditions and an action graph corresponding to the trigger graph, the action graph indicating one or more actuator actions associated with at least one of the plurality of actuators, and a trigger module, upon detecting the one or more trigger conditions, triggering the at least one of the plurality of actuators to perform the one or more actuator actions indicated by the action graph. In some embodiments, the computer 1500 may include other or additional modules for performing any one of or combination of steps described in the embodiments. Further, any of the additional or alternative embodiments or aspects of the method, as shown in any of the figures or recited in any of the claims, are also contemplated to include similar modules.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some aspects, one or more of the modules 1560-1570 can be integrated as a single module, performing the corresponding functions of the integrated modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above with reference to any one or all of the steps of the disclosure can be installed in and sold with one or more computing devices consistent with the disclosure. Alternatively, the software can be obtained and loaded into one or more computing devices, including obtaining the software through a physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components outlined in the description or illustrated in the drawings. The embodiments herein are capable of other embodiments and capable of being practiced or carried out in various ways. Also, it will be understood that the phraseology and terminology used herein are for description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Also, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems, and methods employed in accordance with the illustrated embodiments can be implemented, at least in part, in digital electronic circuitry, analog electronic circuitry, or computer hardware, firmware, software, or in combinations of them. These components can be implemented, for example, as a computer program product such as a computer program, program code or computer instructions tangibly embodied in an information carrier, or a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other units suitable for use in a computing environment. A computer program can be deployed to be executed on one computer or multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code, or instructions to perform functions (e.g., by operating on input data and/or generating an output). Method steps can also be performed by, and apparatus for performing the methods can be implemented as, special purpose logic circuitry, e.g., an FPGA (field-programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, an FPGA or other programmable logic device, discrete gate, or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory, or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" (or "computer-readable medium") means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium or combination of multiple media, that is capable of storing instructions for execution by one or more processors 1505, such that the instructions, when executed by one or more processors 1505, cause the one or more processors 1505 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Although the present disclosure has been described with reference to specific features and embodiments thereof, it is evident that various modifications and combinations can be made thereto without departing from the scope of the disclosure. For example, other components may be added to, or removed from, the described systems. The specification and drawings are, accordingly, to be regarded simply as an illustration of the disclosure as defined by the appended claims, and are contemplated to cover any modifications, variations, combinations, or equivalents that fall within the scope of the present disclosure. Other aspects may be within the scope of the following claims.

What is claimed is:

1. A computer-implemented method for automated operation of network devices within a home communication network, the method comprising:
   decoding, by at least one processor of a computing device, first information received from a plurality of actuators within the home communication network using a wireless connectivity circuitry of the computing device, the first information indicating a plurality of actuator actions performed by the plurality of actuators within the home communication network based on user interaction, each actuator of the plurality of actuators configured to change a state of at least one network device;
   decoding, by the at least one processor of the computing device, second information received from a plurality of sensors in the home communication network using the wireless connectivity circuitry, the second information indicating one or more sensor values generated by the plurality of sensors;
   retrieving, by the at least one processor, a machine learning (ML) model from storage of the computing device, the ML model being trained with a training data set of the home communication network to correlate the first information and the second information;
   generating, by the at least one processor, a correlation between the plurality of actuator actions and the one or more sensor values based on applying the ML model to the first information and the second information;
   generating, by the at least one processor, configuration data based on the correlation, the configuration data comprising:
      a trigger graph with one or more trigger conditions, the one or more trigger conditions specifying at least one of the plurality of actuator actions; and
      an action graph corresponding to the trigger graph, the action graph indicating one or more automatic actuator actions associated with at least one actuator of the plurality of actuators;
   detecting, by the at least one processor, a trigger condition of the one or more trigger conditions specified by the trigger graph; and
   causing, by the at least one processor, the at least one actuator of the plurality of actuators to perform the one or more automatic actuator actions indicated by the action graph based on the detecting the one or more automatic actuator actions performed without the user interaction.

2. The computer-implemented method according to claim 1, wherein the one or more trigger conditions include one or more of the following:
   the one or more sensor values;
   an actuator action of the plurality of actuator actions; or
   external data received from an information source outside of the home communication network.

3. The computer-implemented method according to claim 2, wherein the one or more trigger conditions within the trigger graph are connected via one or more logical connectors.

4. The computer-implemented method according to claim 3, further comprising:
   causing the at least one actuator of the plurality of actuators to perform the one or more automatic actuator actions based on the detecting of the trigger condition of the one or more trigger conditions and further based on the one or more logical connectors.

5. The computer-implemented method according to claim 1, wherein the action graph comprises:
  a plurality of nodes coupled via edges, each node of the plurality of nodes corresponding to an automatic actuator action of the one or more automatic actuator actions associated with the at least one actuator of the plurality of actuators.

6. The computer-implemented method according to claim 5, wherein each edge of the edges coupling at least two nodes of the plurality of nodes is associated with a time delay between the one or more automatic actuator actions corresponding to the at least two nodes.

7. The computer-implemented method according to claim 1, further comprising:
  acquiring the training data set from the storage of the computing device, the training data set including a plurality of pre-determined trigger conditions and a plurality of pre-determined actuator actions, the plurality of pre-determined actuator actions corresponding to the plurality of pre-determined trigger conditions;
  training the ML model prior to the generating of the correlation, the training using at least the training data set.

8. The computer-implemented method according to claim 7, further comprising:
  retrieving user-defined objectives for the automated operation of the network devices within the home communication network;
  retrieving pre-defined sensor-actuator relationships, the pre-defined sensor-actuator relationships grouping a subset of the plurality of actuators with a subset of the plurality of sensors based on common sensor and actuator locations; and
  generating the configuration data further based on the user-defined objectives and the pre-defined sensor-actuator relationships.

9. The computer-implemented method according to claim 1, wherein the configuration data comprises a table of automated rules, the table of automated rules including a plurality of trigger graphs and a corresponding plurality of action graphs, wherein the plurality of trigger graphs includes the trigger graph, and wherein the plurality of action graphs includes the action graph.

10. The computer-implemented method according to claim 9, further comprising:
  retrieving, using the wireless connectivity circuitry, a second table of automated rules for a second home communication network; and
  modifying one or both of the plurality of trigger graphs or the corresponding plurality of action graphs in the configuration data based on the second table of automated rules.

11. A system for automated operation within a home communication network, the system comprising:
  a plurality of actuators within the home communication network, each actuator of the plurality of actuators configured to change a state of at least one network device within the home communication network;
  a plurality of sensors within the home communication network, the plurality of sensors configured to generate sensor data including one or more sensor values;
  a memory storing instructions; and
  at least one processor in communication with a wireless connectivity circuitry, the memory, the plurality of actuators, and the plurality of sensors, the at least one processor configured, upon execution of the instructions, to perform the following steps:
    decoding first information received from the plurality of actuators using the wireless connectivity circuitry, the first information indicating a plurality of actuator actions performed by the plurality of actuators within the home communication network based on user interaction;
    decoding second information received from the plurality of sensors using the wireless connectivity circuitry, the second information indicating the one or more sensor values;
    retrieving a machine learning (ML) model from the memory, the ML model being trained with a training data set of the home communication network to correlate the first information and the second information;
    generating a correlation between the plurality of actuator actions and the one or more sensor values based on applying the ML model to the first information and the second information;
    generating configuration data based on the correlation, the configuration data comprising:
      a trigger graph with one or more trigger conditions, the one or more trigger conditions specifying at least one of the plurality of actuator actions; and
      an action graph corresponding to the trigger graph, the action graph indicating one or more automatic actuator actions associated with at least one actuator of the plurality of actuators;
    detecting a trigger condition of the one or more trigger conditions specified by the trigger graph; and
    causing the at least one actuator of the plurality of actuators to perform the one or more automatic actuator actions indicated by the action graph based on the detecting the one or more automatic actuator actions performed without the user interaction.

12. The system according to claim 11, wherein the trigger graph comprises the one or more trigger conditions connected via one or more logical connectors, the one or more trigger conditions including one or more of the following:
  the one or more sensor values;
  an actuator action of the plurality of actuator actions; or
  external data received from an information source outside of the home communication network.

13. The system according to claim 12, wherein the operations further comprise:
  causing the at least one actuator of the plurality of actuators to perform the one or more automatic actuator actions based on the detecting of the trigger condition of the one or more trigger conditions and further based on the one or more logical connectors.

14. The system according to claim 11, wherein:
  the action graph comprises a plurality of nodes coupled via edges, each node of the plurality of nodes corresponding to an automatic actuator action of the one or more automatic actuator actions associated with the at least one actuator of the plurality of actuators; and
  each edge of the edges coupling at least two nodes of the plurality of nodes is associated with a time delay between the one or more automatic actuator actions corresponding to the at least two nodes.

15. The system according to claim 11, wherein the operations further comprise:
  acquiring the training data set from the memory, the training data set including a plurality of pre-determined trigger conditions and a plurality of pre-determined actuator actions, the plurality of pre-determined actuator actions corresponding to the plurality of pre-determined trigger conditions;

training the ML model prior to the generating of the correlation, the training using at least the training data set.

16. The system according to claim 15, wherein the operations further comprise:

retrieving user-defined objectives for the automated operation within the home communication network;

retrieving pre-defined sensor-actuator relationships, the pre-defined sensor-actuator relationships grouping a subset of the plurality of actuators with a subset of the plurality of sensors based on common sensor and actuator locations; and generating the configuration data further based on the user-defined objectives and the pre-defined sensor-actuator relationships.

17. The system according to claim 11, wherein the configuration data comprises a table of automated rules, the table of automated rules including a plurality of trigger graphs and a corresponding plurality of action graphs, wherein the plurality of trigger graphs includes the trigger graph, and wherein the plurality of action graphs includes the action graph.

18. The system according to claim 17, wherein the operations further comprise:

retrieving a second table of automated rules for a second home communication network; and modifying one or both of the trigger graph or the action graph in the configuration data based on the second table of automated rules.

19. A non-transitory computer-readable media storing instructions for automated operation of network devices within a home communication network, that configure at least one processor, upon execution of the instructions, to perform the following steps:

decoding first information received from a plurality of actuators within the home communication network using a wireless connectivity circuitry of the computing device, the first information indicating a plurality of actuator actions performed by the plurality of actuators within the home communication network based on user interaction, each actuator of the plurality of actuators configured to change a state of at least one network device;

decoding second information received from a plurality of sensors in the home communication network using the wireless connectivity circuitry, the second information indicating one or more sensor values generated by the plurality of sensors;

retrieving a machine learning (ML) model from storage of the computing device, the ML model being trained with a training data set of the home communication network to correlate the first information and the second information;

generating a correlation between the plurality of actuator actions and the one or more sensor values based on applying the ML model to the first information and the second information;

generating configuration data based on the correlation, the configuration data comprising:

a trigger graph with one or more trigger conditions, the one or more trigger conditions specifying at least one of the plurality of actuator actions; and an action graph corresponding to the trigger graph, the action graph indicating one or more automatic actuator actions associated with at least one actuator of the plurality of actuators;

detecting a trigger condition of the one or more trigger conditions specified by the trigger graph; and causing the at least one actuator of the plurality of actuators to perform the one or more automatic actuator actions indicated by the action graph based on the detecting the one or more automatic actuator actions performed without the user interaction.

20. The non-transitory computer-readable medium of claim 19, wherein upon execution, the instructions further cause the at least one processor to perform operations comprising:

acquiring the training data set from the storage of the computing device, the training data set including a plurality of pre-determined trigger conditions and a plurality of pre-determined actuator actions, the plurality of pre-determined actuator actions corresponding to the plurality of pre-determined trigger conditions;

training the ML model prior to the generating of the correlation, the training using at least the training data set.

* * * * *